US008247050B2

(12) United States Patent
McCrea et al.

(10) Patent No.: US 8,247,050 B2
(45) Date of Patent: Aug. 21, 2012

(54) METAL-COATED POLYMER ARTICLE OF HIGH DURABILITY AND VACUUM AND/OR PRESSURE INTEGRITY

(75) Inventors: Jonathan McCrea, Toronto (CA); Fracisco Gonzalez, Toronto (CA); Gino Palumbo, Toronto (CA); Klaus Tomantschger, Mississauga (CA); Rich Emrich, Toronto (CA); Konstantinos Panagiotopoulos, Etobicoke (CA); Mary Pasquantonio, Richmond Hill (CA); John Kratochwil, Aurora (CA); Herath Katugaha, Toronto (CA)

(73) Assignee: Integran Technologies, Inc., Toronto, Ontario (CA)

( * ) Notice: Subject to any disclaimer, the term of this patent is extended or adjusted under 35 U.S.C. 154(b) by 499 days.

(21) Appl. No.: 12/476,485

(22) Filed: Jun. 2, 2009

(65) Prior Publication Data

US 2010/0304063 A1    Dec. 2, 2010

(51) Int. Cl.
*B32B 1/00* (2006.01)
*B32B 1/02* (2006.01)
*B32B 1/08* (2006.01)
*B32B 15/04* (2006.01)
*B32B 15/08* (2006.01)
*B32B 27/14* (2006.01)
*B32B 27/20* (2006.01)
*F16L 9/02* (2006.01)
*F16L 9/147* (2006.01)

(52) U.S. Cl. ............... 428/35.8; 428/34.1; 428/34.4; 428/34.5; 428/34.7; 428/35.9; 428/36.4; 428/36.5; 428/36.6; 428/36.8; 428/36.91; 428/457

(58) Field of Classification Search .......... 428/34.1, 428/34.4–34.7, 35.7–35.9, 36.4–36.91, 457
See application file for complete search history.

(56) References Cited

U.S. PATENT DOCUMENTS

| | | | |
|---|---|---|---|
| 3,625,758 A | 12/1971 | Stahl | |
| 3,652,351 A | 3/1972 | Guisti | |
| 3,671,411 A | 6/1972 | Ray et al. | |
| 4,054,693 A | 10/1977 | Leech | |
| 4,231,847 A | 11/1980 | Lui | |
| 4,234,398 A | 11/1980 | Yamamoto | |

(Continued)

FOREIGN PATENT DOCUMENTS

CA        2 562 042 C      6/2006

(Continued)

OTHER PUBLICATIONS

Gudimov, et al.; "Effect of the metallic coating of polymer films on their gas permeability", Fiziko-Khimichna Mekhanika Materialiv (1971), 7(2), pp. 59-63 (abstract only).

(Continued)

*Primary Examiner* — Walter B Aughenbaugh
(74) *Attorney, Agent, or Firm* — Bacon & Thomas, PLLC

(57) ABSTRACT

Metal-coated polymer articles containing structural substantially porosity-free, fine-grained and/or amorphous metallic coatings/layers optionally containing solid particulates dispersed therein on polymer substrates, are disclosed. The substantially porosity-free metallic coatings/layers/patches are applied to polymer or polymer composite substrates to provide, enhance or restore vacuum/pressure integrity and fluid sealing functions. Due to the excellent adhesion between the metallic coating and the polymer article satisfactory thermal cycling performance is achieved. The invention can also be employed as a repair/refurbishment technique. The fine-grained and/or amorphous metallic coatings are particularly suited for strong and lightweight articles, precision molds, sporting goods, aerospace and automotive parts and other components exposed to thermal cycling and stress created by erosion and impact damage.

20 Claims, 4 Drawing Sheets

U.S. PATENT DOCUMENTS

| | | | |
|---|---|---|---|
| 4,425,380 A | 1/1984 | Nuzzi | |
| 4,552,626 A | 11/1985 | Stevenson | |
| 4,568,589 A | 2/1986 | Briggs | |
| 4,592,852 A | 6/1986 | Courduvelis | |
| 4,601,784 A | 7/1986 | Krulik | |
| 4,704,196 A | 11/1987 | Saito | |
| 4,839,006 A | 6/1989 | Nakao | |
| 4,859,300 A | 8/1989 | Sullivan | |
| 4,879,182 A | 11/1989 | Presswood | |
| 5,062,930 A | 11/1991 | Dillon | |
| 5,203,973 A | 4/1993 | Reith | |
| 5,229,169 A | 7/1993 | Chao | |
| 5,352,266 A | 10/1994 | Erb | |
| 5,433,797 A | 7/1995 | Erb | |
| 5,516,415 A | 5/1996 | Palumbo | |
| 5,527,445 A | 6/1996 | Palumbo | |
| 5,538,615 A | 7/1996 | Palumbo | |
| 5,648,125 A | 7/1997 | Cane | |
| 5,863,410 A | 1/1999 | Yates | |
| 6,149,749 A | 11/2000 | McBroom | |
| 7,320,832 B2 | 1/2008 | Palumbo | |
| 7,354,354 B2 | 4/2008 | Palumbo | |
| 2003/0234181 A1 | 12/2003 | Palumbo | |
| 2004/0138058 A1* | 7/2004 | Sambasivan et al. | 502/208 |
| 2005/0199587 A1 | 9/2005 | Bengston | |
| 2005/0205425 A1 | 9/2005 | Palumbo | |
| 2008/0008836 A1 | 1/2008 | Kipp | |

FOREIGN PATENT DOCUMENTS

| | | |
|---|---|---|
| DE | 102 28 323 B4 | 1/2004 |
| WO | 04/001100 A1 | 12/2003 |
| WO | 2009/045247 A1 | 4/2009 |

OTHER PUBLICATIONS

Springer, et al.; "Permeability of metallized polymer films; Method for measuring the gas permeability", Journal of Applied Polymer Science (1979), 24(2), pp. 329-337 (abstract only).

Humpenoder; "Gas permeation of fiber-reinforced plastics", Wissenschaftliche Berichte—Forschungzentrum Karlsruhe (1997), FZKA 5879, pp. 1-96 (abstract only).

Li et al.; "Significant improvement of adhesion between gold thin films and a polymer", Applied Surface Science (2004), 233 (1-4), 227-233 (abstract only).

Yang et al.; "The cohesive crack and buckle delamination resistances of indium tin oxide (ITO) films on polymeric substrates with ductile metal interlayers", Surface of Coatings Technology (2010), 204(16-17), 2761-2766 (abstract only).

* cited by examiner

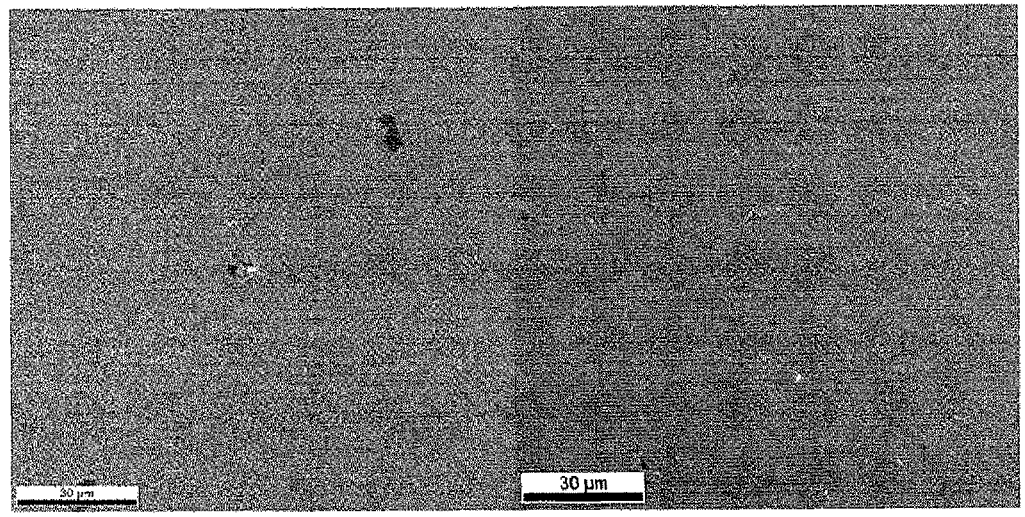
FIGURE 5  (a)                                    (b)
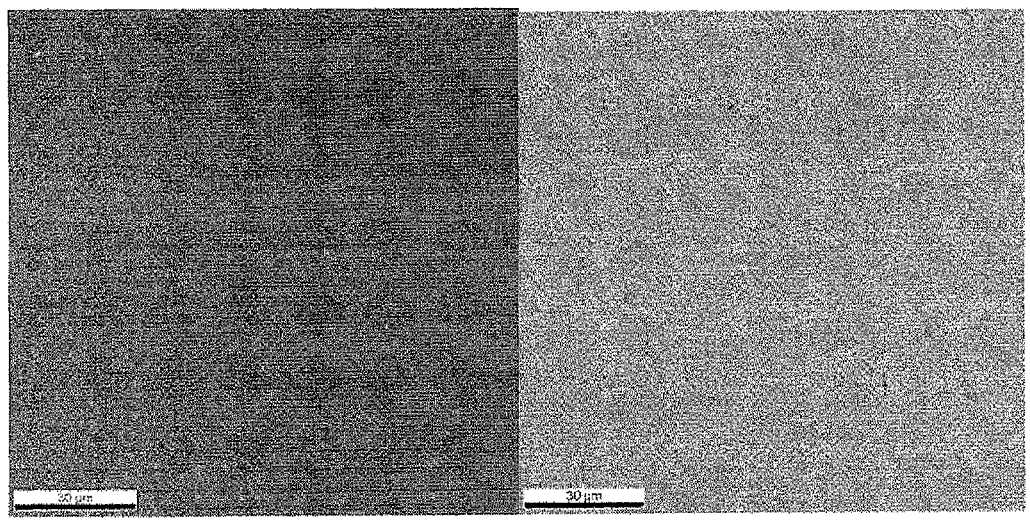
FIGURE 5  (c)                                    (d)

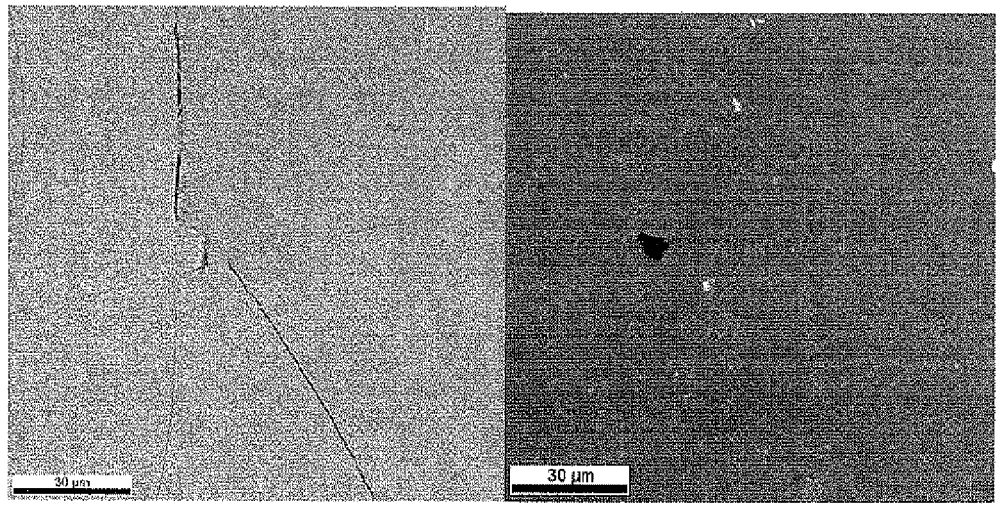
FIGURE 5 (e)        (f)
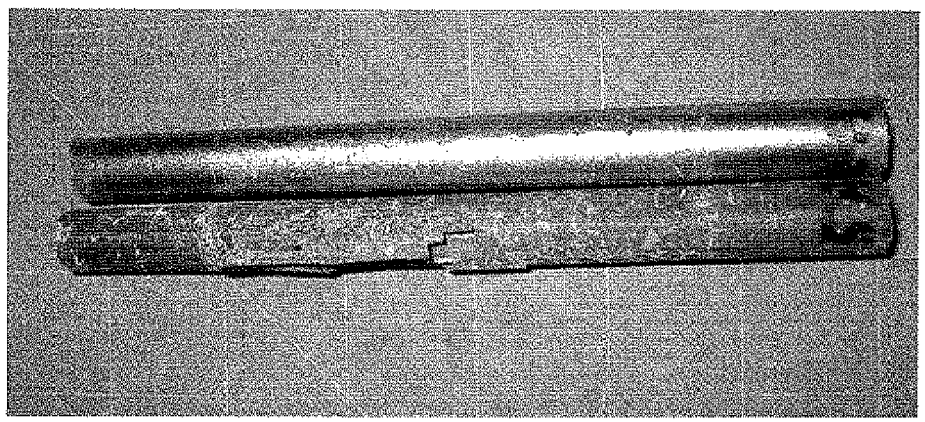
FIGURE 6

METAL-COATED POLYMER ARTICLE OF HIGH DURABILITY AND VACUUM AND/OR PRESSURE INTEGRITY

FIELD OF THE INVENTION

This invention relates to applying conforming, fine-grained or amorphous metallic barrier layers or patches to polymer articles. The substantially porosity-free coating protects the polymer substrates from erosion and impact damage and provides or restores vacuum/pressure integrity and fluid sealing functions to polymer articles such as composite laminates which are micro cracked and/or degrade during use when in direct contact with the fluid.

BACKGROUND OF THE INVENTION

Due to their low cost and ease of processing/shaping by various means, polymeric materials, which are optionally filled with or reinforced with materials selected from the group of metals, metal alloys, and/or carbon based materials selected from the group of graphite, graphite fibers, carbon and carbon nanotubes, glass, glass fibers and other inorganic fillers, are widely used. Problems encountered with polymeric materials include poor strength, low hardness, low wear and erosion resistance, residual porosity, cracks induced during forming, handling or abuse and susceptibility to degradation by certain fluids (gases, liquids) resulting in undesired swelling, leaching, erosion and cracking.

Applying metal coatings or layers to the surface of polymer parts is of considerable commercial importance because of the desirable properties obtained by combining polymers and metals. Metallic layers/coatings that are strong, hard tough and substantially porosity free can be applied by various commercial process methods including electroless deposition techniques and/or electrodeposition. The metal deposits must adhere well to the underlying polymer substrate even in corrosive environments and when subjected to stress, impact, thermal cycling, erosion and wear, as encountered in outdoor or industrial service. When used in repair/refurbishment of polymer articles a relatively thin net shape metallic coating applied without the use of an adhesive may be desired to maintain the original dimensions.

The prior art describes numerous processes for repairing polymer parts:

Briggs in U.S. Pat. No. 4,568,589 (1986) describes a patch and method of repair of the integrity and/or surface imperfections of a structure which is defective because of accidental damage or flaws during the course of manufacture or subsequent use and handling. The invention relates to the use of a fibrous cloth which is impregnated by a fast curing acrylic-based adhesive composition containing an activator/accelerator that is applied to the faulty work piece and cured at ambient temperature. The improved material provides good adhesion to a wide variety of materials including unprepared metals, painted metals, plastics and moist or oil contaminated surfaces and displays a high impact.

Kipp in US 2008/0008836 (2008) describes a method for enhancing the vacuum integrity and for extending the useful life of a mold-type forming tool operable with negative pressure. The method comprises preparing a surface of the tool to receive a sealing coating thereon; optionally applying a primer material to the surface; applying a sealing coating comprising urea and polyurethane to the surface, and curing the sealing coating to effectuate the bond between the sealing coating and the surface, and to seal the surface.

Presswood in U.S. Pat. No. 4,879,182 (1989) describes a way of sealing a carbon body such as monolithic graphite tooling so that it retains its vacuum integrity through numerous thermal cycles typical of thermoplastic processing. This is accomplished by applying a coating composed of a carbon-filled solution of a polyamic acid to the carbon body surface, and curing the coated body to cause the polyamic acid to imidize into a thermally cured polyimide.

McBroom in U.S. Pat. No. 6,149,749 (2000) describes a patch of fiber reinforced plastics composite material, a repair kit including such a patch and a method of using such a patch and repair kit. The patch is attached to a surface of a fiber reinforced plastics composite structure where damage has occurred. The patch includes fiber reinforcement and plastic matrix materials and the patch contains a series of small apertures to allow the passage of gases and other matter through the patch to prevent entrapped air weakening the repair.

The prior art describes methods for applying metallic coatings to polymer parts:

Lui in U.S. Pat. No. 4,231,847 (1980) describes a method of electrodepositing an alloy of nickel and iron having a low temperature expansion coefficient. The method includes the steps of forming an aqueous electrolyte solution of nickel and iron salts and electrodepositing a nickel iron alloy onto a substrate. Suitable substrates include lightweight graphite materials having a low coefficient of linear thermal expansion.

Various patents address the preparation of grain-refined, strong, metallic layers and articles for a variety of applications:

Erb in U.S. Pat. No. 5,352,266 (1994), and U.S. Pat. No. 5,433,797 (1995), assigned to the same applicant, describe a process for producing nanocrystal line materials, particularly nanocrystalline nickel. The nanocrystalline material is electrodeposited onto the cathode in an aqueous acidic electrolytic cell by application of a pulsed current.

Palumbo DE 102 28 323 (2005), assigned to the same applicant, discloses a process for forming coatings or free-standing deposits of nanocrystalline metals, metal alloys or metal matrix composites. The process employs tank, drum plating or selective plating processes using aqueous electrolytes and optionally a non-stationary anode or cathode. Nanocrystalline metal matrix composites are disclosed as well.

Tomantschger in U.S. Ser. No. 12/003,224 (2007), assigned to the same applicant, discloses variable property deposits of fine-grained and amorphous metallic materials, optionally containing solid particulates.

Palumbo in U.S. Pat. No. 7,320,832 (2008), assigned to the same applicant, discloses means for matching the coefficient of thermal expansion of a fine-grained metallic coating to the one of the substrate by adjusting the composition of the alloy and/or by varying the chemistry and volume fraction of particulates embedded in the coating. The fine-grained metallic coatings are particularly suited for strong and lightweight articles, precision molds, sporting goods, automotive parts and components exposed to thermal cycling and include polymer substrates optionally reinforced with conductive fibers. Maintaining low coefficients of thermal expansion and matching the coefficient of thermal expansion of the fine-grained metallic coating with the one of the substrate minimizes dimensional changes during thermal cycling and prevents delamination.

Palumbo in U.S. Pat. No. 7,354,354 (2008), assigned to the same applicant, discloses lightweight articles comprising a polymeric material at least partially coated with a fine-grained metallic material. The fine-grained metallic material has an average grain size of 2 nm to 5,000 nm, a thickness between 25 micron and 5 cm, and a hardness between 200 VHN and 3,000 VHN. The lightweight articles are strong and ductile and exhibit high coefficients of restitution and a high stiffness and are particularly suitable for a variety of applications including aerospace and automotive parts, sporting goods, and the like.

Various patents address the use of electroplating to form grain-refined, metallic coatings on metallic substrates as a repair technique:

Palumbo in U.S. Pat. No. 5,516,415 (1996), U.S. Pat. No. 5,527,445 (1996) and U.S. Pat. No. 5,538,615 (1996) discloses a process for repairing degraded sections of metal tubes, such as heat exchanger tubes, by in situ electroforming a metallic layer on the inside of the tube. The electroformed structural layer has an ultrafine grain microstructure of sufficient thickness to restore the degraded section at least to its original mechanical specifications.

Palumbo in US2003/0234181A1 (2003) describes a process for in-situ electroforming a structural layer of metallic material to an outside wall of a metal tube for repairing an external surface area of a degraded section of metallic work pieces, especially of tubes and tube sections. Preferably, the metallic layer coatings are made of fine-grained metals, metal alloys or metal matrix composites. Also described is a process for plating "patches" onto degraded areas by selective plating including brush plating.

SUMMARY OF THE INVENTION

The invention relates to applying substantially porosity-free, conforming metallic barrier layers or patches to at least part of the surface of polymer based substrates/articles to enhance strength, durability and vacuum and/or pressure integrity. The substantially porosity-free (porosity preferably <1.5%) metallic layers comprise strong, rigid, amorphous or fine-grained metallic coatings, layers and/or patches. By applying suitable activation processes, good adhesion is achieved between the metallic layers and the polymer or polymer composite substrates resulting in excellent thermal cycling performance. The invention can also be employed as a repair/refurbishment technique. The fine-grained and/or amorphous metallic layer is applied by a process selected from the group consisting of electrodeposition, electroless deposition, physical vapor deposition (PVD), chemical vapor deposition (CVD) and cold spraying.

It is an objective of this invention to provide lightweight articles with increased vacuum and/or pressure integrity, strength, stiffness, durability, wear and erosion resistance, thermal conductivity and thermal cycling capability.

The vacuum and/or pressure integrity of an article is measured as described in detail in the "Vacuum Integrity Test Specification" below. Similarly, the determination of the porosity of the metallic layer, as well as other relevant test protocols, are described in detail below.

Determination of a loss of vacuum with time in the Vacuum Integrity Test carried out according to said "Vacuum Integrity Test Specification" to be between 0 and 0.6 mm Hg connotes passing the Vacuum Integrity Test.

It is an objective of this invention to at least partially coat the inner or outer surface of parts including complex shapes with fine-grained and/or amorphous metallic materials that are substantially porosity free, strong, lightweight, have high toughness and stiffness (e.g., resistance to deflection and higher natural frequencies of vibration) and are able to withstand thermal cycling without degradation.

It is an objective of the invention to provide metallic coatings, layers and/or patches selected from the group of amorphous and/or fine-grained metals, metal alloys or metal matrix composites for fluid sealing purposes. The metallic coating/layer is applied to at least part of the surface of the polymer substrate using a suitable deposition process, preferably electrodeposition.

It is an objective of the invention to utilize the enhanced mechanical strength, erosion and wear properties of fine-grained metallic coatings/layers with an average grain size between 2 and 10,000 nm and/or amorphous coatings/layers and/or metal matrix composite coatings exhibiting a low coefficient of friction. Graded and/or layered structures can be employed as well.

It is an objective to apply stiff, rigid and tough metallic coatings and/or metallic patches to complex part geometries by a process enabling net-shape-forming of conforming shapes on parts of complex geometries.

It is an objective to provide conforming, porosity-free metallic coatings and/or metallic patches to polymer parts as a structural repair or refurbishment technique.

It is an objective of the invention to enhance the strength of polymer articles at elevated temperatures to counteract the softening/loss of stiffness of polymeric materials as well as at lower temperatures where polymers become brittle.

It is an objective of the invention to provide metal coated polymer articles of high strength at ambient temperatures and/or operating temperature extremes within the limits of the glass transition temperature of the polymer.

It is an objective of the invention to apply porosity-free, rigid, strong, tough and ductile metallic coatings and/or metallic patches to provide fluid sealing functions or re-establish vacuum integrity to a polymer part, prevent outgassing of polymer substrates and prevent leaching/degradation of the polymer parts by reducing and/or inhibiting fluid access directly to the polymeric material.

It is an objective of the invention to apply metallic coatings and/or metallic patches to polymer parts which contain multiple micro cracks, voids and holes (diameter between 10 nm-5 mm) in all or at least part of the polymer to reestablish vacuum and/or pressure integrity without the need of utilizing organic fillers or sealers.

It is an objective of the invention to provide a method for repairing a damaged area of a fiber reinforced plastics composite structure, the method including in-situ net-shape-forming a patch comprising an airtight metallic layer on the damaged area.

It is an objective of the invention to apply metallic barrier coatings and/or metallic patches to carbon fiber reinforced polymers (CFRP) and fiber reinforced polymers (FRP) parts which have a significant residual "porosity", i.e., >1.5%, due to inherent voids, cracks and microcracks.

It is an objective of the invention to apply metallic coatings and/or metallic patches to polymer parts to increase the vacuum/pressure integrity and enhance the burst pressure of the component.

It is an objective of the present invention to provide strong, lightweight substantially porosity-free, ductile, conforming metallic barrier layers and/or patches to polymer substrates/articles for use in a number of applications including, but not limited to, automotive, aerospace and defense applications; industrial components; electronic equipment or appliances; sporting goods; molding applications and medical applications.

It is an objective of the present invention to apply metallic coatings to polymer parts to provide enhanced structural integrity and resistance against damage from impact incidents.

Due to the increased use of composite structural materials in airframes, such as fuselages, wings, etc., the aerospace industry has been at the forefront in the design, development, and fabrication of various complex shaped composite parts. Composite parts used in the airframes must meet stringent requirements for durability and dimensional tolerance. It is therefore an objective of the invention to apply strong and tough metallic coatings on at least selected areas of polymer substrates subject to impact as well as high wear and erosion rates and prevent cracking and loss of strength and integrity of the underlying polymer substrate including leading edges of aircraft propellers, rotor blades, nose cones, wings or wing parts (flaps, access covers) or any other external surface to prevent erosion damage by rain, hail, snow, sand, debris, birds and the like.

It is an objective of this invention to provide polymer articles, coated with fine-grained and/or amorphous metallic layers that are stiff, lightweight, resistant to abrasion, resistant to permanent deformation, do not splinter when cracked or broken and are able to withstand thermal cycling without degradation, for a variety of applications including, but not limited to: applications requiring cylindrical objects including gun barrels; shafts, tubes, pipes and rods for use as golf, arrow, skiing and hiking pole shafts, tent poles; various drive shafts; fishing poles; baseball bats, bicycle frames, ammunition casings, wires and cables and other cylindrical or tubular structures for use in commercial goods; medical equipment including orthopedic prosthesis, implants and surgical tools; sporting goods including golf shafts, heads and faceplates; lacrosse sticks; hockey sticks; skis and snowboards as well as their components including bindings; racquets for tennis, squash, badminton; bicycle parts; components and housings for electronic equipment including laptops; cell phones; personal digital assistants (PDAs) devices; walkmen; discmen; MP3 players and BlackBerry®-type devices; cameras and other image recording devices as well as TVs; automotive components including beat shields; cabin components including seat parts, steering wheel and armature parts; fluid conduits including air ducts, fuel rails, turbocharger components, oil, transmission and brake parts, fluid tanks and housings including oil and transmission pans; cylinder head covers; spoilers; grill-guards and running boards; brake, transmission, clutch, steering and suspension parts; brackets and pedals; muffler components; wheels; brackets; vehicle frames; spoilers; fluid pumps such as fuel, coolant, oil and transmission pumps and their components; housing and tank components such as oil, transmission or other fluid pans including gas tanks; electrical and engine covers; industrial/consumer products and parts including linings on hydraulic actuator, cylinders and the like; drills; files; knives; saws; blades; sharpening devices and other cutting, polishing and grinding tools; housings; frames; hinges; sputtering targets; antennas as well as electromagnetic interference (EMI) shields; molds and molding tools and equipment; aerospace parts including wings; wing parts including flaps and access covers; structural spars and ribs; propellers; rotors; rotor blades; rudders; wings and wing parts; covers; housings; fuselage parts; nose cones landing gear; lightweight cabin parts; ducts and interior panels and military products including ammunition, armor as well as firearm components; liquid and gaseous pressurized storage containers at cryogenic, ambient and elevated temperatures It is an objective of the invention to provide a polymer component comprising suitable polymers, polymeric resins or polymeric composites as listed in the polymer substrate composition specification below.

It is an objective of this invention to provide a fine-grained and/or amorphous metallic layer as listed in the metallic layer composition specification below comprising metals and alloys as well as metal matrix composites. Metal matrix composites consist of fine-grained and/or amorphous pure metals or alloys with suitable particulate additives. The latter additives include powders, fibers, nanotubes, flakes, metal powders, metal alloy powders, carbon, nitride and metal oxide powders of various compositions. The fine-grained and/or amorphous metallic material has a high yield strength (300 MPa to 2,750 MPa) and ductility (0.5-50%).

It is another objective of the invention to suitably pretreat the surface of polymeric materials to achieve excellent adhesion between the metallic layer and the polymer material.

It is an objective of the invention to provide a polymer metal interface with an anchoring structure which has a population of anchoring sites such as recesses, protrusions, crevices, craters, recesses and the like to enhance the physical bond to the metal layer in exceeding 10 per cm, preferably exceeding 100 per cm and more preferably exceeding 1,000 per cm and up to 1,000,000 per cm, preferably up to 10,000,000 per cm with a depth and diameter/width in the range of between 0.01 and 1,000 micron as the overall adhesion is governed by the bond strength between the polymer substrate and the immediately adjacent metallic layer.

It is an objective of the invention to provide a polymer substrate with an interface layer which has been preconditioned to have a surface roughness Ra in the range of between 0.01 μm and 500 μm and/or Ry (or $Ry_{max}$ according to DIN) in the range of between 0.1 μm and 5,000 μm. In the context of this application the average surface roughness Ra is defined as the arithmetic mean of the absolute values of the profile deviations from the mean line and Ry (or $Ry_{max}$ according to DIN) is defined as the distance between the highest peak and the lowest valley of the interface surface.

It is an objective of the invention to apply the metallic material directly onto the polymer substrate. Alternatively, one or more intermediate layers selected from the group of metal layers, metal alloy layers, metal matrix composite layers, conductive polymer layers, adhesive layers and partially or fully cured bonding layers can be employed.

It is an objective of the invention to apply the fine-grained and/or amorphous metallic coating to at least a portion of the surface of a part made substantially of glass fiber composites and/or carbon/graphite fiber composites including carbon fiber/epoxy composites, optionally after metalizing the surface (layer thickness ≦5 micron, preferably ≦1 micron) with a thin layer of aluminum, nickel, cobalt, copper, titanium, silver or the like for the purpose of enhancing the electrical conductivity of the substrate surface to enable applying the porosity-free, conforming metal layer by electrodeposition. The use of conductive paints is contemplated as well. The fine-grained and/or amorphous coating is always substantially thicker (≧10 micron) than the metalizing layer.

It is an objective of this invention to provide articles composed of fine-grained and/or amorphous metallic coatings on composite polymer substrates having a vacuum and/or pressure integrity as represented by a leak test in air described below of ≦6.6 mm mercury pressure per hour and per $cm^2$ measuring area [≦6.6 mm Hg/(hr×$cm^2$ area)], preferably ≦2.6 mm mercury pressure per hour and per $cm^2$ measuring area [≦2.6 mm Hg/(hr×$cm^2$ area)], and preferably <1.3 mm mercury pressure per hour and per $cm^2$ measuring area [≦1.3 mm Hg/(hr×cm² area)], and as low as 0 mm mercury pressure per hour and per cm² measuring area after applying a vacuum of 29" (736.6 mm) Hg.

It is an objective of this invention to provide articles comprising one or more fine-grained and/or amorphous metallic coatings, optionally graded or layered, on composite polymer substrates passing the Vacuum Integrity Test after being exposed to ASTM D7136 "*Standard Test Method for Measuring the Damage Resistance of a Fiber-Reinforced Polymer Matrix Composite to a Drop-Weight Impact Event*"), whereby a 4-pound weight with a hemispherical tip of 0.5" and a hardness of 60 HRC is dropped from a height of 48" onto the test samples securely fastened at the instrument base, representing a total impact energy of 24 Joules.

It is an objective of this invention to provide articles composed of fine-grained and/or amorphous metallic coatings on composite polymer substrates with a porosity of less than 1.5%, preferably less than 1% as determined by the "*Standard Test Method for Determining the Porosity of Coatings*". There is a variety of tests available for measuring the porosity of electrodeposited coatings including, but not limited to, microscopic evaluation, chemical tests, corrosive gas exposure tests and electrochemical methods.

It is an objective of this invention to provide articles composed of fine-grained and/or amorphous metallic coatings on composite polymer substrates resulting in less than 100 pits when measured according to ASTM D3170/SAE J400 "*Standard Test Method for Chipping Resistance of Coatings*". It is a further objective of this invention to provide articles which, after being exposed to the chipping resistance test (e.g., 10 seconds test duration, 70 psi air pressure, room temperature), still pass the Vacuum Integrity Test.

It is an objective of the invention to achieve adhesion strength as measured using ASTM D4541-02 Method A-E "*Standard Test Method for Pull-Off Strength of Coatings Using Portable Adhesion Testers*" between the coating and the activated substrate which exceeds 200 psi, 300 psi, preferably 500 psi and more preferably 600 psi and up to 6,000 psi.

It is an objective of the invention to improve the adhesion between the polymer substrate and the metallic layer by a suitable heat treatment of the metal-clad article for between 5 minutes and 50 hours at between 50 and 200° C.

It is an objective of this invention to provide articles composed of fine-grained and/or amorphous metallic coatings on composite polymer substrates capable of withstanding 1, preferably 5, more preferably 10, more preferably 20 and even more preferably 30 temperature cycles without failure according to ANSI/ASTM specification B604-75 section 5.4 (*Standard Recommended Practice for Thermal Cycling Test for Evaluation of Electroplated Plastics ASTM B553-71*) for service condition 1, preferably service condition 2, preferably service condition 3 and even more preferably for service condition 4. It is a further objective of this invention to provide articles which, after being exposed to the thermal cycling test, still pass the Vacuum Integrity Test.

Accordingly, the invention is directed to a metal-coated polymer article comprising: A metal-coated polymer article comprising:
  (i) a polymeric material;
  (ii) a metallic material having a microstructure which is fine-grained with an average grain size between 2 and 5,000 nm and/or amorphous, the metallic material being in the form of a metallic layer having a thickness between 10 micron and 2.5 cm and a porosity between 0 and 1.5%;
  (iii) with or without at least one intermediate layer between the polymeric material and the metallic material;
  (iv) said metal-coated polymer article exhibiting:
    a) a pull-off strength between the polymeric material and the metallic material and between any intermediate layer(s) and the metallic material and between any intermediate layer(s) and the polymeric material exceeding 200 psi as determined by ASTM D4541-02 Method A-E; and
    b) said metal-coated polymer article having a leak rate in air of between 0 and 6.6 mm Hg pressure per hour and per cm² measuring area after applying a vacuum of 29" of Hg and measuring the loss of vacuum over the duration of 60 minutes; and
    c) said metal-coated polymer article exhibiting no delamination after said article has been exposed to at least one temperature cycle according to ASTM B553-71 service condition 1, 2, 3 or 4.

DEFINITIONS

As used herein, the terms "metal-coated polymer article", "laminate article" and "metal-clad polymer article" mean an item which contains at least one polymeric material and at least one metallic layer in intimate contact covering at least part of the surface of said polymeric material. In addition, one or more intermediate layers, such as metalizing layers and polymer layers including adhesive layers, can be employed between said metallic layer and said polymer article.

As used herein, the terms "mold," "tool," "forming tool" and "forming mold" mean a type of forming tool or mold used to create or form composite parts or products. To form the composite parts the forming tool is required to provide an airtight seal while applying positive and/or negative pressure. Examples of forming tools include, but are not limited to, polymer composite forming tools.

As used herein, the term "resin" means any organic resin known in the art suitable for use with the present invention. Resins may include, among others, thermosetting resins, thermoplastic resins, and polymeric resins. It is intended that a resin, as described herein, include all suitable polymers, derivates, solvates and mixtures thereof.

As used herein, the term "filled" or "reinforced" refers to polymer resins which contain fillers embedded in the polymer, e.g., fibers made of graphite, carbon nanotubes, glass and metals; powdered mineral fillers (i.e., average particle size 0.01-25 microns) such as talc, calcium silicate, silica, calcium carbonate, alumina, titanium oxide, ferrite, and mixed silicates. A large variety of filled polymers having a filler content of up to about 75% by weight or volume are commercially available from a variety of sources. If required, e.g., in the case of electrically non-conductive or poorly conductive substrates and the use of electroplating for the coating deposition, the substrates can be metalized to render them sufficiently conductive for plating.

As used herein, "prepreg" is an abbreviation for pre-impregnated reinforcement fabrics and/or fibers mats which are commercially available and used to provide structure and reinforcement for composite articles. The prepreg member is either a dry or wet lay-up component. A dry lay-up is typically a pre-formed structure partially formed prior to being placed onto the release layer. A wet lay-up consists of placing a fabric or fibers onto the release layer, whereupon a liquid epoxy composition is subsequently poured onto the fibers to impregnate the fibers. A partial curing step may be applied to the prepreg member where necessary.

As used herein, the term "metallic coating" or "metallic layer" means a metallic deposit/layer applied to part of or the entire exposed surface of a polymer article. The substantially porosity-free metallic coating is intended to adhere to the surface of the polymer article to provide an airtight seal that improves, extends or restores the vacuum and/or pressure integrity and mechanical strength of the polymer article.

As used herein, the term "metal matrix composite" (MMCs) in this context is defined as particulate matter embedded in a fine-grained and/or amorphous metal matrix. MMCs can be produced, e.g., in the case of using an electroless plating or electroplating process, by suspending particles in a suitable plating bath and incorporating particulate matter into the deposit by inclusion or, e.g., in the case of cold spraying, by adding non-deformable particulates to the powder feed.

As used herein, the term "coating thickness" or "layer thickness" refers to depth in a deposit direction.

As used herein, the term "surface" means a surface located on a particular side of an article. A side of an article may include various surfaces or surface areas, including, but not limited to, a polymer article surface area, a fastener surface area, a seam or joint surface area, etc. Thus, when indicating a coating is applied to a "surface" of an article, it is intended that such surface may comprise any one or all of the surfaces or surface areas located on that particular side of the article being coated.

As used herein, the term "vacuum and/or pressure integrity," means the article's ability to provide a gas-tight seal capable of sustaining a negative or positive applied pressure for a predetermined period of time. The lack/loss of vacuum and/or pressure integrity means that the article or forming tool is or has become sufficiently porous and lost its ability to maintain the applied pressure with time. As the degradation of vacuum/pressure integrity is caused by deterioration of the polymer and/or the metal, e.g. cracking, it also adversely affects the mechanical strength of the article, i.e., an increased "gas leak rate" indicates that the mechanical properties of the article have deteriorated and repair/replacement is warranted.

As used herein the term "leak rate in air" means loss of vacuum per hour per unit area, e.g., as determined using the Vacuum Integrity Test Specification.

As used herein, the term "burst pressure," means the maximum pressure which can be applied to an article or vessel without causing it to rupture.

As used herein, the term "substantially porosity-free metallic coating," means the metallic coating has a porosity of less than 1.5%, preferably less than 1%.

As used herein, "anodically assisted chemical etching" means that the surface of the polymer substrate to be coated is activated by applying anodic polarization to the substrate which is submersed in a conventional chemical etching solution thereby simultaneously chemically and electrochemically activating the surface to achieve a superior bond between the substrate and the subsequently applied coating.

As used herein, "surface roughness" and "surface topography" means an irregular surface topography described with terms such as 'uneven', 'irregular', and the like. Surface roughness consists of surface irregularities which result from the various surface preconditioning methods used such as mechanical abrasion and etching. These surface irregularities combine to form the "surface texture" which directly influences the bond strength achieved between the polymer article and the metallic layer.

In practice there are many different parameters used for analyzing surface finish, and many more have been developed for special products/circumstances. The parameter most frequently used in North America for surface roughness is Ra. It measures the average roughness by comparing all the peaks and valleys to the mean line, and then averaging them all over the entire length that the stylus is dragged across the surface. It's also referred to as CLA (center line average) and AA (area average). Benefits to using the Ra method are its simplicity and its widespread use. The RMS (root mean square) of a given surface typically runs about 10% higher than it equivalent Ra (average roughness) value.

In reality, however, the Ra value doesn't provide a detailed enough description of the surface finish of a part. Another parameter that can be useful is $Ry_{max}$ formerly called just $R_{max}$. This is an ISO standard that measures the distance between the highest peak and the lowest valley over a cutoff length. This is, however, a sensitive method and, if over the measurement length a scratch or imperfection is encountered, the reading may be meaningless. Similarly, Ry depicts the maximum roughness depth.

Another parameter most widely used in Europe is Rz, or mean roughness depth. The Rz ISO standard is also called "Ten Point Average Roughness". It averages the height of the five highest peaks and the depth of the five lowest valleys over the measuring length, using an unfiltered profile. The Rz DIN standard averages the highest point and lowest point over five cutoffs.

Metal-coated polymer articles of the invention comprise fine-grained and/or amorphous metallic layers having a porosity of less than 1.5%, preferably of less than 1%, a layer thickness of at least 0.010 mm, preferably more than 0.025 mm, more preferably more than 0.050 mm and even more preferably more that 0.100 mm.

Articles of the invention comprise a single or several fine-grained and/or amorphous metallic layers applied to the polymer substrate as well as multi-layer laminates composed of alternating layers of fine-grained and/or amorphous metallic layers and/or polymer substrates. Metallic layers can be homogenous, layered or graded.

According to one aspect of the present invention an article is provided by using electrodeposition to from the metallic layer which comprises the steps of, positioning the metallic or metalized work piece to be plated in a plating tank containing a suitable electrolyte and a fluid circulation system, providing electrical connections to the work piece/cathode to be plated and to one or several anodes and plating a structural layer of a metallic material with an average grain size of equal to or less than 5,000 nm on the surface of the metallic or metalized work piece using suitable direct current (D.C.) or pulse electrodeposition processes described, e.g., in the co-pending application US 2005/0205425 and/or U.S. Ser. No. 12/003, 224 (2007). Alternative electroplating approaches such as brush-plating are contemplated as well, as are other metal deposition methods, including, but not limited to electroless deposition, PVD, CVD and cold spraying.

The bond achieved between the metallic coating and the surface of the article/forming tool should be configured to be as strong and durable as possible. The bond should be strong to avoid crack formation, delamination and/or blistering during use and/or during temperature cycling. Moreover, in the case of applying metallic patches, the bond should be particularly strong around the edges of the metallic coating to ensure the metallic coating does not separate from the surface of the polymer and compromise the vacuum and/or pressure integrity and strength of the article.

According to one aspect of the present invention the polymer substrate surface is treated with a novel activation/etching method to achieve good adhesion to subsequently applied coatings involving anodically polarizing conductive polymers/polymer composites in aqueous etching solutions as described in co-pending application by McCrea et. al. entitled "Anodically Assisted Chemical Etching of Conductive Polymers and Polymer Composites".

According to yet another aspect of the present invention metal-coated polymer articles are provided containing structural fine-grained and/or amorphous metallic coatings/layers optionally containing solid particulates dispersed therein on polymer substrates. The fine-grained and/or amorphous metallic coatings are particularly suited for strong and lightweight articles, precision molds, sporting goods, automotive parts, aerospace parts and components exposed to thermal cycling although the coefficient of liner thermal expansion of the metallic layer and the one of the substrate are mismatched as described in the co-pending application by Tomantschger et. al. entitled "Metal-Clad Polymer Article".

According to this invention, the entire polymer article can be coated, i.e., encapsulated with the metallic layer. Alternatively, metallic patches or sections can be formed on selected areas of the polymer article only, e.g., golf club head face plates, sections of forming tools and leading edges of components exposed to high fluid flow, without the need to coat the entire article.

According to this invention patches or sleeves which are not necessarily uniform in thickness can be deposited in order to, e.g., enable a thicker coating on selected sections or sections particularly prone to heavy use, erosion or wear.

The following listing further defines the laminate article, metal clad and metal-plated polymer article of the invention:
(i) Polymer Substrate Specification:
Minimum Vacuum Integrity (maximum leak rate in air in mm per hour and cm$^2$ area when time averaged over one hour) [mm Hg/(hr×cm$^2$ area)]: 100; ∞.
Maximum Vacuum Integrity (minimum leak rate in air in mm per hour and cm$^2$ area when time averaged over one hour) [mm Hg/(hr×cm$^2$ area)]: 0; 2.6.
Polymeric materials comprise at least one of: unfilled or filled epoxy, phenolic and melamine resins; polyester resins; urea resins; melamine resins; elastomers such as natural rubber; polybutadienes; polyisoprenes; butadiene-styrene copolymers; polyurethanes; thermoplastic polymers such as thermoplastic polyolefins (TPOs) including polyethylene (PE) and polypropylene (PP); polyamides, mineral filled polyamide resin composites; polyphthalamides, polyphtalates, polystyrene, polysulfone, polyimides; neoprenes; polybutadienes; polyisoprenes; polyacrylics; butadiene-styrene copolymers; poly-ether-ether-ketone (PEEK); polycarbonates; polyesters; liquid crystal polymers (LCP) such as partially crystalline aromatic polyesters based on p-hydroxybenzoic acid and related monomers; polycarbonates; acrylonitrile-butadiene-styrene (ABS); polyvinyls, chlorinated polymers such polyvinyl chloride (PVC); and fluorinated polymers such as polytetrafluoroethylene (PTFE). Polymers can be crystalline, semi-crystalline or amorphous.
Filler additions: metals (Ag, Al, In, Mg, Si, Sn, Pt, Ti, V, W, Zn); metal oxides (Ag$_2$O, Al$_2$O$_3$, SiO$_2$, SnO$_2$, TiO$_2$, ZnO); carbides or nitrides of B, Cr, Bi, Si, W; carbon (carbon, carbon fibers, carbon nanotubes, diamond, graphite, graphite fibers); glass; glass fibers; fiberglass; metalized fibers such as metal coated glass, carbon and graphite fibers; mineral/ceramic fillers such as talc, calcium silicate, silica, calcium carbonate, alumina, titanium dioxide, ferrite, mica and mixed silicates (e.g. bentonite or pumice). In addition to fillers with a high aspect ratio, other fillers such as glass, ceramics and mineral fillers such as talc, calcium silicate, silica, calcium carbonate, alumina, titanium dioxide, ferrite, and mixed silicates (e.g. bentonite or pumice) can be employed as well.

During molding polymer chains do not necessarily align themselves in a random manner but rather display directionality depending on part geometry and mold design, molding conditions, material flow patterns etc. Similarly, fiber additions usually align in the plane and the electrical and thermal conductivities of such composites in the plane can be 10-100 times higher than perpendicular to the plane. Therefore, directional properties need to be considered in laminate articles. Selected polymeric materials, particularly filled or reinforced polymeric materials, can display properties including the coefficient of liner thermal expansion values which are not isotropic, but vary significantly with the direction. Polymer substrates, in one or more directions, typically have a CLTE) in the range of $20\times10^{-6}$ K$^{-1}$ to $500\times10^{-6}$ K$^{-1}$. As an example, glass filled polyamide can have coefficient of linear thermal expansion (CLTE) values as low $20\text{-}75\times10^{-6}$ K$^{-1}$ in one direction and as high as $100\text{-}250\times10^{-6}$ K$^{-1}$ in another direction. In the case of fiber reinforced polymer materials, as fibers usually align in the plane of the part during molding, the CLTE of the polymer in the plane is typically lower than the CLTE perpendicular/normal to it.
Minimum particulate/fiber fraction [% by volume]: 0; 1; 5; 10
Maximum particulate/fiber fraction [% by volume]: 50; 75; 95
(ii) Metallic Coating/Layer Specification:
One or more metallic layers of the same or different chemistry and microstructure are applied, including graded and laminated layers.
Microstructure: Amorphous and/or crystalline
Minimum average grain size [nm]: 2; 5; 10
Maximum average grain size [nm]: 100; 500; 1,000; 5,000; 10,000
Metallic Layer Thickness Minimum [in]: 10; 25; 30; 50; 100
Metallic Layer Thickness Maximum [mm]: 5; 25; 50
Minimum Vacuum Integrity (maximum leak rate in air in mm per hour and cm$^2$ area when time averaged over one hour) [mm Hg/(hr×cm$^2$ area)]: 6.6; 2.6; 1.3.
Maximum Vacuum Integrity (minimum leak rate in air in mm per hour and cm$^2$ area when time averaged over one hour) [mm Hg/(hr×cm$^2$ area)]: 0
Minimum Yield Strength Range [MPa]: 300
Maximum Yield Strength Range [MPa]: 2,750
Minimum Hardness [VHN]: 100; 200; 400
Maximum Hardness [VHN]: 800; 1,000; 2,000
Minimum Deposition Rates [mm/hr]: 0.01; 0.05; 0.1; 0.2; 0.5
Minimum Porosity [%]: 0; 0.01
Maximum Porosity [%]: 0.75; 1.0; 1.5
Minimum coefficient of friction: 0.001; 0.01
Maximum coefficient of friction: 1
Metallic Materials comprising at least one of: Ag, Al, Au, Co, Cr, Cu, Fe, Ni, Mo, Pb, Pd, Pt, Rh, Ru, Sn, Ti, W, Zn and Zr
Other alloying additions: B, C, H, O, P and S
Particulate additions: metals (Ag, Al, In, Mg, Si, Sn, Pt, Ti, V, W, Zn); metal oxides (Ag$_2$O, Al$_2$O$_3$, CoO, CuO, In$_2$O$_3$, MgO, NiO, SiO$_2$, SnO$_2$, TiO$_2$, V2O5, ZnO); carbides and nitrides of Al, B, Cr, Bi, Si, W; carbon (carbon nanotubes, diamond, graphite, graphite fibers, Buckminster Fullerenes); glass; polymer materials (PTFE, PVC, PE, PP, ABS, epoxy resins) and self lubricating materials such as MoS$_2$.
Minimum particulate fraction [% by volume]: 0; 1; 5; 10
Maximum particulate fraction [% by volume]: 50; 75; 95
(iii) Metal/Polymer Intermediate Layer Specification:
One or more intermediate layers are selected from the group of polymer and metallic intermediate layers Polymer Intermediate Layer: same composition as above for
(i) polymer substrate including partly cured layers prior to
coating and using a post-finish heat-treatment, also curable
polymeric conductive paints (carbon, Cu, Ag filled curable
polymers, adhesive layer).

Metallic Intermediate Layer: same composition as above for
(ii) metallic coating and including an amorphous and/or
fine-grained as well as a coarse-grained microstructure; Ni,
Co, Cu and/or Ag comprising coatings applied by electroless deposition, PVD, CVD and spraying techniques.

Metal/Polymer/Intermediate Layer Interface Specification:

Minimum surface roughness Ra, Ry, $Ry_{max}$, Rz [μm]: 0.01;
0.02; 0.05; 0.1; 1.

Maximum surface roughness Ra, Ry, $Ry_{max}$, Rz [μm]: 25; 50;
500; 5,000.

Optionally, additional intermediate layers can be added
using, e.g., electroless deposition, PVD, CVD, spraying
techniques and electrodeposition.

(iv) Metal-Coated Polymer Article Specification:

Adhesion:

Minimum pull-off strength of any metallic layer or any intermediate layer according to ASTM D4541-02 Method A-E
[psi]: 200; 300; 400; 600

Maximum pull-off strength of any metallic layer or any intermediate layer according to ASTM D4541-02 Method A-E
[psi]: 2,500; 3,000; 6,000

Vacuum and/or Pressure Integrity Performance:

Vacuum integrity: leak rate of under 6.6 mm Hg/(hr×cm$^2$
area), preferably under <2.6 mm Hg/(hr×cm$^2$ area).

Thermal Cycling Performance:

Minimum thermal cycling performance according to ASTM
B553-71: 1 cycle according to service condition 1 without
failure (no blistering, delamination or <2% displacement)
and with <2% displacement between the polymer and
metallic layer.

Maximum thermal cycling performance according to ASTM
B553-71: infinite number of cycles according to service
condition 4 without failure.

The yield strength and or ultimate tensile strength of the
metal-clad polymer article exceeds 10 MPa, preferably 100
MPa and can be as high as 5,000 MPa. The polymer substrate comprises between 5-95% of the total weight of the
metal-clad polymer article.

The following description summarizes the relevant test
protocols employed:

Metallic Layer Porosity Test Information:

To determine the porosity the samples are polished to a 1 μm
diamond polish and imaged in a light microscope to 400×
magnification. The degree of porosity in percent is determined using image analysis, e.g., ImageJ (Image Processing and Analysis in Java provided by the US NIH at http://
rsbweb.nih.gov/ij/) relating the area fraction of pores,
cracks, pits etc. to the total surface of the samples.

Adhesion Test Specification:

ASTM D4541-02 "*Standard Test Method, for Pull-Off
Strength of Coatings Using Portable Adhesion Testers*" is a
test for evaluating the pull-off strength of a coating on rigid
substrates determining the greatest perpendicular force (in
tension) that a coating/substrate interface surface area can
bear before it detaches either by cohesive or adhesive failure. This test method maximizes tensile stress as compared
to shear stress applied by other methods, such as scratch or
knife adhesion and the results may not be comparable.
ASTM D4541-02 specifies five instrument types identified
as test Methods A-E and the pull off strength reported is an
average of at least three individual measurements.

Thermal Cycling Test Specification:

ANSI/ASTM specification B604-75 section 5.4 ("*Standard
Recommended Practice for Thermal Cycling Test for
Evaluation of Electroplated Plastics ASTM B553-71*"). In
this test the samples are subjected to a thermal cycle procedure as indicated in Table 1. In each cycle the sample is
held at the high temperature for an hour, cooled to room
temperature and held at room temperature for an hour and
subsequently cooled to the low temperature limit and maintained there for an hour.

TABLE 1

Standard Recommended Practice for Thermal Cycling Test for
Evaluation of Electroplated Plastics According to ASTM B553-71

| Service Condition | High Limit [° C.] | Low Limit [° C.] |
|---|---|---|
| 1 (mild) | 60 | −30 |
| 2 (moderate) | 75 | −30 |
| 3 (severe) | 85 | −30 |
| 4 (very severe) | 85 | −40 |

If any blistering, delamination or cracking is noted the
sample is considered to have failed and the test is immediately
suspended. After 10 such test cycles the sample is allowed to
cool to room temperature, is carefully checked for delamination, blistering and cracking and the total displacement of the
coating relative to the substrate is determined.

Vacuum Integrity Test Specification:

As no accepted standard test method for vacuum and/or pressure integrity appears to be in use a simple test has been
devised to measure gas permeability. The "Vacuum Integrity" of the polymer substrates and the metal-coated polymer samples is measured in a vacuum test fixture. The test
fixture consisted of a 10 cm×10 cm aluminum plate with
rubber seal having in its center a 3" diameter hole (measuring area: 7.07 in$^2$; 45.6 cm$^2$) connected to a pressure
gauge and a valved port connected to a vacuum pump.
Vacuum grease is applied to the rubber seal and the fixture
is placed on the surface of the sample and a vacuum pressure of 29 in (736.6 mm) Hg is applied to the sample
aperture of 45.6 cm$^2$, the valve connecting the test fixture to
the pump is closed and the loss of vacuum with time
recorded, typically over 1 hour.

Chipping Resistance Test Specification:

ASTM D 3170-03 (SAE J400) "*Standard Test Method for
Chipping Resistance of Coatings*", describes a procedure
for testing the resistance of surface coatings to chipping by
gravel impact. The gravelometer test is designed to evaluate the resistance of surface coatings (paint, clear coats,
metallic plating, etc.) to chipping caused by the impacts of
gravel or other flying objects primarily to simulate the
effects of the impact of gravel or other debris on automotive parts. The test is designed to reproduce the effect of
gravel or other media striking exposed coated surface and
relies on coupons 6" by 12". The test coupons are bombareded with media of certain sizes by a controlled air blast
typically at 70 psi for 10 sec and room temperature in a
gravelometer. After the gravel impact, the degree of chipping is determined by visual comparison (number and size
of chips) and rated accordingly.

Drop Test Specification:

ASTM D7136 "*Standard Test Method for Measuring the
Damage Resistance of a Fiber-Reinforced Polymer Matrix
Composite to a Drop-Weight Impact Event*"), whereby a
4-pound weight with a hemispherical tip of 0.5" and a
hardness of 60 HRC was dropped from a height of 48" onto the test samples securely fastened at the instrument base, representing a total impact energy of 24 Joules.

BRIEF DESCRIPTION OF THE DRAWINGS

In order to better illustrate the invention by way of examples, descriptions are provided for suitable embodiments of the method/process/apparatus according to the invention in which:

FIG. 5 shows optical micrographs of the surface of (a) and (b) fine-grained Ni with a different average grain-size, (c) n-Ni-20Fe, (d) n-Ni-50Fe, (e) n-Ni-80Fe, and (f) a Ni-7P as used for the determination of porosity as described.

FIG. 6 is a picture of an uncoated CFRP test tube and a fine-grained Ni coated CFRP coated test tube after completion of the SAE J400 gravelometer test (13 pints of gravel).

DETAILED DESCRIPTION

Figure 1:
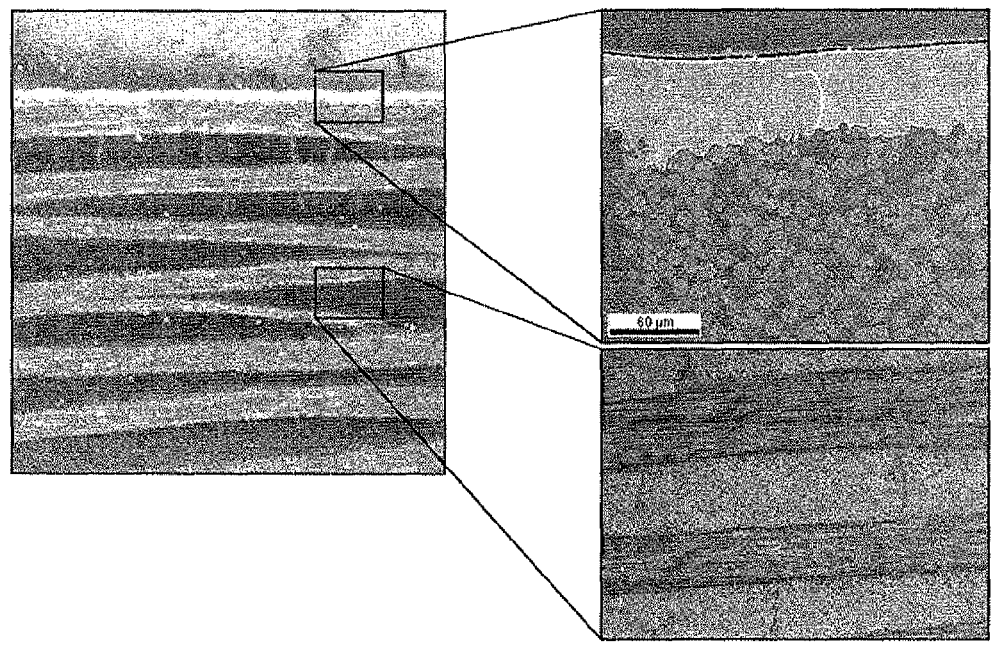
FIG. 1 shows a cross section of a cracked CFRP tool coated with a 50 μm thick fine-grained Ni-58Fe alloy according to the invention to restore vacuum and/or pressure integrity.

This invention relates to articles comprising conforming, substantially porosity-free, metallic barrier layers on polymer substrates and methods of applying these metallic coatings. The substantially porosity-free metallic layer provides or restores vacuum/pressure integrity, fluid sealing functions, wear and erosion resistance to polymer articles such as composite laminates which are micro cracked and/or degrade/swell when in direct contact with the fluid.

Voids are generally formed in thin films and coatings irrespective of the synthesis method. The vacuum, pressure and mechanical integrity of the coating is compromised by porosity, which in the case of electrodeposited coatings, includes pores, voids, cracks and the like introduced during the coating deposition and/or formed thereafter due to the inherent stress in the deposit or induced by stress, wear and/or corrosion. It is observed that the porosity of a metallic coating is not necessarily exclusively an "inherent material property" as the porosity of a coating layer is usually affected by the deposition conditions, the coating thickness (thicker coatings tend to have lower porosity) and the substrate topography/texture/roughness, i.e., in the case of very thin coatings the substrate topography predominantly determines the coating porosity.

Articles made according to the invention are highly resistant to erosion and chipping damage when impacted by various media including, but not limited to, rain, hail, snow, ice, gravel and sand. The combination of lower porosity and fewer cracks, voids and other imperfections in the surface layer exposed to wear and erosion and the fine grained and/or amorphous metallic microstructure which results in increased hardness and strength significantly benefits the erosion and chipping resistance. The inventive process further lends itself for repair and refurbishment of degraded articles. The metallic coatings have a fine-grained and/or amorphous microstructure and are preferably produced by DC or pulse electrodeposition and/or electroless deposition. Acceptable thermal cycling performance is achieved by enhancing the pull-off strength by suitable surface activation and/or surface roughness and/or metal-polymer interface surface design and/or the employ of intermediate metallic or polymeric layers and/or matching of the coefficient of liner thermal expansion of the metallic coating and the substrate.

In a preferred embodiment this invention relates to polymer substrates reinforced with carbon/graphite and/or glass/fiberglass fibers in applications requiring high vacuum and/or pressure integrity. A major advantage of reinforced polymer composites molds and toolings, such used in the manufacture of composite materials and the like, is the low coefficient of liner thermal expansion (CTLE) which is typically between 1 ppm per ° C. and 25 ppm per ° C. Its porosity, however, is a drawback resulting in loss of structural and vacuum/pressure integrity.

Polymer composite tooling are frequently used in the fabrication of parts, particularly composite parts for civilian and military aircraft, on- and off-road vehicles and boats as well as a large number of sporting goods. Using such tools or molds comprises first to provide a "release layer" which is placed onto the mold surface to reduce the bonding of the part to be produced to the mold surface and to enable easy part removal. The part to be formed is thereafter laid up on or otherwise applied to the tool, and finally cured by application of heat or heat and pressure. Such tools include lay up mandrels for large composite parts, compression mold dies; molds for vacuum forming and rotary molding tools. These tools, during fabrication of the part, are subjected to temperatures of up to between about 200° C. to 350° C., and after completion of the curing are subsequently rapidly cooled down to near room temperature. The forming tool or forming mold is designed to provide an airtight seal in order to achieve the desired negative pressure. Therefore, one or more surfaces of the forming tool is/are configured to be impervious to airflow.

Such tools, however, can sustain damage due to normal wear and tear, or abnormal surface damage during transport or while in service and furthermore degradation including micro cracking caused by repeated thermal cycling. The forming tool may contain undesirable cracks, pores or grooves that may weaken or otherwise render the forming tool unusable and compromise the vacuum and/or pressure integrity of the forming tool. These defects may be created by any number of events including shipping and/or handling, prolonged use, normal wear and tear, misuse, accidental impact or cuts, exposure to high temperatures for extended periods of time. Other reasons for leaks to develop include locations where fasteners, such as bolts, which pass through the forming tool, or seams where one part of the forming tool joins another part, become pervious to airflow. Once the forming tool lose its sealing ability, repair or replacement is required.

It is worth highlighting that the loss of vacuum and/or pressure integrity itself may not necessarily be important in all applications polymer articles are is used in; however, the loss of vacuum and/or pressure integrity created by manufacturing defects, impacts or other damage, due to the creation of micro-cracks is an indirect measure of the loss of structural integrity of parts and an indication that the part needs to be replaced or repaired, regardless of whether vacuum and/or pressure integrity are required or not.

Various applications including, but not limited to, aircraft and other transportation vehicle parts, require a high reliability and due to safety concerns the preferred approach is to apply a fine-grained and/or amorphous metallic coating to the polymer part prior to use. Lightweight structures used in aerospace and industrial applications are frequently carbon fiber laminates and are often sandwich reinforced structures comprising spaced laminates separated by a lightweight support structure such as honeycomb, foam or truss structure.

When such polymeric structures are used on or near external vehicle parts they are prone to impact damage, e.g., by rain, snow or hail; sand or other debris; other airborne objects including birds and/or thermal cycling degradation in outside service. In the case of industrial use, e.g., in the case of molds and tooling used indoor they are prone to damage from dropped tools, cutting tools, damage during part removal caused by insufficient use of mold release compound, cracking caused by repeated thermal cycling and the like. Frequently visible damage at the outer surface is observed such as cuts, craters, recesses, depressions, erosions and pits usually accompanied by outer surface and subsurface cracks and, in particular, in the case of a reinforced structure, cracks and cuts frequently extend right through the polymeric structure and cause the loss of strength and vacuum and/or pressure integrity thereby rendering the tool/mold/part unsuitable for further use.

Consequently, a preferred embodiment of this invention relates to a method for enhancing the durability, structural and vacuum and/or pressure integrity of a new part upon fabrication by the application of the conforming metallic coating. The method comprises (a) suitably preparing/activating the surface of the polymer part to receive a metallic coating thereon; (b) optionally applying one or more intermediate layers selected from the group of a primer, an is adhesive layer, an intermediate metallic layer, a conductive paint to the surface; and (c) applying one or more fine grained and/or amorphous metallic coatings to the surface of at least part of the polymer part's outer surface.

The proposed invention can also be successfully employed to repair or refurbish damaged polymer articles including fiber reinforced polymer composite structures. As highlighted, vacuum and/or pressure integrity is required for tools that are used to fabricate a number of parts including carbon fiber reinforced polymer (CFRP) components. Vacuum is applied during processing and the tool must be able to hold the applied vacuum while the part is curing. In the past, repairs and or refurbishments performed on damaged polymer articles and tools of complex shape relied on materials which can be readily formed and shaped such as epoxies, fiber impregnated resins and cement fillers. Prior art methods to repair damaged molds/tools addressed locally damaged sites. There are currently no methods available to repair tools that have lost vacuum and/or pressure integrity not just in local areas but due to an extensive network of micro-cracks in the entire resin due to the composite tool being continually thermally cycled from room temperature to close to the glass transition temperature. Conventional coating techniques such as gel coats have not been completely successful in restoring vacuum and/or pressure integrity due to a poorly matched coefficient of liner thermal expansion and/or brittleness of the coating which leads to the coating itself cracking with continued use. Due to the CLTE mismatch and poor adhesion, conventional electroplated metallic coatings heretofore have not being used for restoring vacuum and/or pressure integrity.

The application of strong, well bonded, non-porous, conforming, metallic coatings with a low coefficient of linear thermal expansion directly applied to the surface of damaged carbon fiber composite tools can restore the vacuum and/or pressure integrity of the tool and furthermore improve the wear and erosion resistance. The resulting metal-coated polymer article has the required durability/toughness and vacuum and/or pressure integrity needed to withstand repeated thermal cycling during use.

Applying a relatively thin, porosity-free, tough/durable metallic coating with the coefficient of linear thermal expansion preferably matched reasonably well to the polymer substrate therefore is a suitable approach to restore the vacuum and/or pressure integrity of a tool surface and is superior to applying patches even of similar materials to the mold/tool itself. Furthermore the ideal repair method should not unnecessarily add thickness and weight to the article and must not degrade the surface quality of the polymer substrate. The desired repair method must be readily scalable to large tools and result in an excellent bond between the coating and the substrate to deal with mismatched coefficients of thermal expansion.

When initiating the repair the area to be treated is typically first "under-dimensioned" by removing some surface material to account for the thickness of the coating to be eventually added. The affected area is thereafter roughened, preferably by mechanical abrading, grit blasting, and/or chemical or plasma etching. The under-dimensioned area is then optionally metalized and finally restored to at least its original dimension by applying the conforming metallic layer. After the metallic coating has been applied, the metallic coating can be ground or machined back to the proper original dimensions of the tool. Suitable finishing processes including milling, grinding, drilling, sanding, and polishing.

Applying polymer sealing coatings or polymer repair patches to polymer parts typically requires the use of both vacuum and heat. Vacuum is applied to ensure that any gas bubbles are expelled from underneath the patch or coating to enhance a good bond. At the same time heat is used to increase the temperature as required to suitably cure the resin of the coating/patch. Nevertheless, the complete elimination of entrapped gases cannot be guaranteed and frequently non-destructive testing may need to be carried out to verify the structural integrity of the repair. Therefore a method of coating and/or patching which avoids gas entrapment is preferred. The employ of electroless plating or electroplating process described herein requires the submersion of the article or the area to be coated in a liquid and forming a metallic layer from the "bottom up" thus eliminating the risk of gas entrapment.

The person skilled in the art of plating will know how to electroplate or electroless plate selected fine-grained and/or amorphous metals, alloys or metal matrix composites choosing suitable plating bath formulations and plating conditions. The person skilled in the art will also know how to apply additives such a stress relievers, levelers and other additives and select deposition conditions to minimize internal-stress induced cracking of the metallic layer and minimize pores/voids to form metallic coatings which are substantially porosity-free.

Applying decorative metallic coatings to polymer and polymer composite parts is in widespread use in consumer and sporting goods, automotive and aerospace applications. More recently, metallic coatings have been applied to polymers and polymer composites to enhance mechanical strength, wear and erosion resistance.

As highlighted above, a variety of fine-grained and/or amorphous metallic coatings, which at room temperature have a coefficient of liner thermal expansion preferably in the range between $-5.0 \times 10^{-6}$ $K^{-1}$ and $25 \times 10^{-6}$ $K^{-1}$, can be employed. One or more metallic coating layers of a single or several chemistries and microstructures can be employed. The metallic coating can be suitably exposed to a finishing treatment such as polishing and/or additional coatings can be applied which can include, among others, electroplating, i.e., chromium plating and/or applying polymeric top coatings such as paints.

In molded polymer composite articles, including carbon/graphite fiber and glass fiber composites, the high CLTE value of the polymer is frequently observed in the direction perpendicular to the metallic coating and the "plane" has a somewhat lower CLTE. The expansion/contraction during thermal cycling therefore exhibits a somewhat limited stress on the interface between the metallic coating and the substrate. In addition, as highlighted, the degree of CLTE mismatch between the coating and the substrate and the bond strength between the coating and the substrate play an important role in preventing delamination and affecting the relative coating/substrate displacement in industrial composite parts exposed to thermal cycling. To clarify, the stronger the bond strength between the polymer and the metallic material the more CLTE mismatch and the higher the temperature fluctuations the laminate article can endure. It is therefore of crucial importance to suitably roughen/pretreat/activate the polymer surface to ensure the bond strength to the coatings and particularly metallic coatings is optimized.

To enhance the bond between the metallic layer and the polymer, polymer surfaces forming the interface with the intermediate or metallic layer are typically preconditioned before coatings are applied. Abrading the surface is one approach used to facilitate the bond of the coating to the surface of the polymer article. As highlighted, the surface preparation also may comprise using chemical etching processes as known in the art.

When dealing with polymer and metallic surfaces that are roughened to improve adhesion, surface features are usually quite irregular and difficult to describe/measure in absolute terms and attempts to quantify surface features responsible for good adhesion between the coating and the substrate have not been successful to date. The industry is therefore relying on a variety of standardized tests measuring adhesion and results from one test are frequently not comparable with results obtained with another test. The most popular test for adhesion between the metallic coating and a polymer substrate are peel tests. The force measured to peel the coating off the substrate relates to a force required to propagate a debond which is artificially generated. Pull tests, on the other hand, measure the force required to initiate debonding and, in the case of structural metal-coated polymer articles, are more relevant as the goal is to increase the force required for initiation of debonding as much as possible.

The appropriate surface preparation of the substrate is known to have a significant impact on the bond strength and adhesion; the preferred approach is to provide means of substantially enhancing the bond strength between the metallic layer and the polymer. As highlighted, the surface topography and the number of crevices per unit area created during the pretreatment procedure have a significant effect on adhesion. Ideally, when employing surface pretreatment methods, "ink-bottle type" cavities are formed in polymer substrates which can act as "anchors" for the metallic layer thus raising the debonding force required. Plateable polymeric compositions therefore frequently employ "removable fillers" which are extracted from the near surface of the metal-polymer interface by a suitable pretreatment prior to metal deposition. In the case of polymer composites containing "permanent fibers", pretreatment methods and conditions can be optimized to "expose" some of the embedded fibers to enable the coating to adhere thereto and, at least partially encapsulate them, again resulting in enhanced bond strength and in an increase in CLTE mismatch between the coating and the substrate that can be tolerated. Many suitable polymer compositions therefore contain both removable and permanent fillers.

Desired metal-polymer interface surface features include can be generated in several ways:

(i) Mechanical Surface Roughing of the Polymer and/or Metal Interface:

The surface of the substrate to be coated can be suitably roughened by a mechanical process, e.g., by sanding, grid blasting, grinding and/or machining.

(ii) Chemical Etching of the Polymer and/or Metal Interface Near-Surface:

Chemical etching, using oxidizing chemicals such as mineral acids, bases and oxidizing compounds such as permanganates, is the most popular method for etching polymers practiced in industry. This method also benefits from the use of "plateable polymer grades" which contain filler materials which, in the near outer surface layer, are dissolved during the etching process.

The co-pending application discloses that the surface activation of conductive polymers/polymer composites is greatly enhanced by simultaneously applying anodic polarization and chemical etching, referred to as "anodically assisted chemical etching" or "anodic assisted etching", drastically enhancing the bond strength between the activated substrate and the applied coating. Simultaneous chemical and electrochemical etching of polymer substrates substantially enhances the bond, peel and shear strength between the polymer substrate and the applied metallic coating/layer as highlighted in the co-pending application.

Solvent free chemical etching can be employed as well including plasma etching or etching with reactive gases including, but not limited to, $SO_3$ and $O_3$, can be employed as well to suitably precondition the surface.

(iii) Swelling of the Polymer Substrate Surface:

Applying of swelling agents to create anchoring structures in the near surface of the polymer with or without the use of etching and abrasion methods can be employed. Suitable swelling agents include organic solvents for one or more polymers in the substrate.

(iv) Applying Adhesive Layers or Partially Cured Polymer Substrates:

Where applicable, partly cured polymer substrates may be activated and coated, followed by an optional curing heat treatment. Similarly, adhesive layers may be applied between the polymer substrate and the metallic coating which can also be followed by an optional curing heat.

(v) Post Cure of Metal-Clad Polymer Article

Another process that can be used to improve the adhesion between the polymer substrate and the metallic layer entails a suitable heat treatment of the metal-clad article for between 5 minutes and 50 hours at between 50 and 200° C.

(vi) Applying the Polymer to a Rough Metal Surface:

Another approach entails first forming the metallic layer with one surface to be covered by the polymer purposely "roughened" and containing suitable surface features/protrusions/surface roughness to create anchoring structures elevating from the metallic surface, recessing into the metal surface or their combinations, to aid in enhancing the adhesion to the polymer substrate. In this case the polymer material is applied onto the metallic material and not vice-versa.

Combinations of two or more of the aforementioned processes can be used as well.

In applications where coatings are applied to substrates it is usually desired for the coefficient of linear thermal expansion (CLTE) of, e.g., the metallic coating to be closely matched to the CLTE of the polymer substrate or polymer composite to avoid delamination/failure during thermal cycling. Similarly in molding applications (blow, injection, compression molding and the like) good matching of the thermal expansion properties of all components is required to avoid spring-back and delamination during the heating and the cooling cycle. The tolerable "CLTE mismatch" between the metallic layer and the polymer depends on the application, the quality of the adhesion between the coating and the polymer substrate, the maximum and minimum operating temperature and the number of temperature cycles the article is required to withstand in its operating life. In all instances, after a predetermined number of thermal cycles according to ANSI/ASTM specification B604-75 section 5.4 ("*Standard Recommended Practice for Thermal Cycling Test for Evaluation of Electroplated Plastics ASTM B553-71*"), the coating relative to the underlying substrate should not fail. Delamination, blistering or cracking of the coating and/or the substrate which would compromise the appearance or performance of the article are all considered failure. Similarly, a displacement of the coating relative to the underlying substrate of more than 2% constitutes failure.

As highlighted, a number of processes can be used to form the metal-coated polymer articles. In the case of using electroplating to apply the metallic layer to the polymer substrate, the polymer substrate, after suitably being activated, is preferably metalized to enhance the surface conductivity typically by applying a thin layer called the "intermediate conductive layer". The intermediate conductive layer can comprise a metallic layer or can comprise polymer material with conductive particulates therein. Where the intermediate conductive layer comprises a metallic layer, the metallic layer is constituted of Ag, Ni or Cu or a combination of any two or all of these, and the intermediate conductive layer can be deposited by electroless deposition, sputtering, thermal spraying, chemical vapor deposition, physical vapor deposition of by any two or more of these. Where the intermediate conductive layer comprises polymer material with conductive particulates therein, it can be, e.g., a conductive paint or a conductive epoxy. The conductive particulates can be composed of or contain Al, Ag, Co, Cu, Ni or Ti or graphite or other conductive carbon or a combination of two or more of these.

One purpose of one or more intermediate layers is to provide an adhesive layer, said adhesive material interacting with and facilitating an improved bond of the metallic coating and the polymer substrate surface. Another purpose of the intermediate layer is to suitably metalize the polymer substrate to render it electrically conductive for the application of substantially porosity free, strong metallic-layers by electrodeposition. Polymeric intermediate layers can be applied by a variety of polymer processing techniques including molding; spreading, painting, and/or spraying preferably followed by drying and/or partial or complete curing. Metallic intermediate layers can be deposited by a process selected from electroless deposition, electrodeposition, physical vapor deposition (PVD), chemical vapor deposition (CVD), powder spraying and gas condensation. As highlighted, multiple intermediate layers including, e.g., a semi cured bonding layer and one or more metallic layer(s), are within the scope of the invention.

The following working examples illustrate the benefits of the invention, namely a comparison of pull-off, peel strength and vacuum integrity for two sets of metal-clad polymer samples processed the same way, namely coated with an organic adhesive layer that is partially cured, then coated with a Ag intermediate layer and a fine-grained Ni-58Fe layer, followed by heat treatment to fully cure the part (Working Example I), repair/refurbishment of a defective CRFP tool by coating with a 50 micron thick fine-grained Ni-58Fe alloy coating (Working Example II); the measurement of the vacuum and/or pressure integrity of metal-coated, graphite-fiber reinforced polymer articles after drop-weight impact testing according to ASTM D7136 (Working Example III and IV); the measurement of the vacuum and/or pressure integrity of metal-coated, graphite-fiber reinforced polymer articles after chip resistance testing according to SAE J400 (Working Example V and Example VI); the measurement of the vacuum integrity of a Ni-20Fe metal-coated graphite-fiber reinforced polymer article after 10 thermal cycles between −196 and 90° C. (Working Example VII); the measurement of the vacuum integrity of Ni-58Fe metal-coated graphite-fiber reinforced polymer articles after 10 thermal cycles according to ANSI/ASTM B604-75 service condition 4 (Working Example VIII); the measurement of the vacuum integrity of a metal-coated graphite-fiber reinforced polymer article after 10 thermal cycles between −196 and 90° C. (Working Example IX); and the measurement of the vacuum integrity of a Ni-58Fe metal-coated graphite-fiber reinforced polymer article after 0, 1, 5 and 10 thermal cycles between 100 and 200° C. (Working Example X);

The invention is illustrated by the following working examples.

WORKING EXAMPLE I

Comparison of Pull-Off and Peel Strength for High Density Polypropylene Coated with an Adhesive Layer, then Metalized with an Ag Intermediate Layer and a Fine-Grained Ni-58Fe Layer with and without Heat Treatment of the Coated Part Two 10×15 cm coupons were cut from a commercial 6 mm ABS sheet (CLTE: ~75×10$^{-6}$ K$^{-1}$ in all directions) The coupons were ground on one side with 80 grit SiC paper to a consistent surface roughness. The samples were then cleaned with Alconox and steel wool, followed by ultrasonically cleaning in deionized water for 5 minutes. The samples were rinsed in isopropanol, dried and degreased with 1,2-dichloroethane to remove any residual oils and/or films.

Subsequently, the coupons were coated with a thin film of a commercial epoxy-based adhesive available from Henkel Canada, Brampton, Ontario (LePage 11). The epoxy based adhesive coating was then partially cured at room temperature for 2 hours. The panels were then chemically etched in alkaline permanganate solution (M-Permanganate P, Product Code No. 79223) available from MacDermid Inc. of Waterbury, Conn., USA at 65° C. for 5 minutes. Following etching, the samples were rinsed in deionized water and submerged in neutralizer solution (M-Neutralize, Product Code No. 79225 also available from MacDermid Inc.) for 5 minutes at room temperature. After neutralizing, the samples were rinsed with deionized water and metalized using a commercial silvering solution (available from Peacock Laboratories Inc., of Philadelphia, Pa., USA; average grain size 28 nm) and coated with 40 μm of fine-grained Ni-58Fe (average grain size ~20 nm, CLTE: ~2×10$^{-6}$ K$^{-1}$, porosity: 0.1%) according to the process of U.S. Ser. No. 10/516,300 (2002).

One of the panels was then subjected to a post-coating curing treatment consisting of heat treating the sample in a drying oven for an additional 2 hours at 50° C. to fully cure the adhesive film. The peel and pull-off adhesion strength of the coatings on the two samples was then measured following ASTM D4541-02 "*Standard Test Method for Pull-Off Strength of Coatings Using Portable Adhesion Testers*" using the "PosiTest AT Adhesion Tester" available from the DeFelsko Corporation of Ogdensburg, N.Y., USA and ASTM B533-85(2004) "*Standard Test Method for Peel Strength of Metal Electroplated Plastics*" using an Instron 3365 testing machine equipped with the 90 degree peel test fixture, and a 5 KN load cell, available from Instron Corporation, Norwood, Mass., USA. In all cases debonding occurred between the polymer material surface and the immediately adjacent metal layer. Vacuum integrity was measured using the test fixture described above measuring the vacuum loss at an applied vacuum of 29" of Hg on an area of 5" diameter (45.6 cm$^2$).

The pull-off and peel adhesion strength for the two samples is summarized in Table 2. While the pull-off strength and the vacuum integrity was the same for both samples, the sample that received a post-coating heat treatment to fully cure the adhesive film displayed a much higher peel strength (more than three fold). This example illustrates that pull off tests and peel tests are not interchangeable and do not produce results which are comparable. Specifically to this example, as high-lighted pull-off strength exceeding 1,000 psi is considered "excellent" for structural metal-clad polymer parts. A peel strength value of 4N/cm, in the case of decorative metal coatings on polymers, is considered to be "very poor", whereas a peel strength value of 12.5 N/cm is considered "excellent".

TABLE 2

Pull-Off Strength Data (ASTM D4541-02), Peel Strength Data (ASTM B533-85) and Vacuum Integrity for Samples With and Without Post Cure Heat Treatment.

| | Pull-off Strength (ASTM D4541-02) [psi] | Peel Strength (ASTM B533-85) [N/cm] | Vacuum Value One Hour After Applying a Vacuum of 29" Hg [" Hg] |
|---|---|---|---|
| Sample 1 without post-cure heat treatment | 1075 | 4.0 | ~29 |
| Sample 2 with post-cure heat treatment | 1100 | 12.5 | ~29 |

Similar results were obtained when the intermediate or the metallic layer comprised "electroless Ni", available from various commercial vendors and consisting of amorphous Ni—P, with a P content ranging from 2-15%

WORKING EXAMPLE II

Repair/Refurbishment of a Defective CRFP Tool by Coating with a 50 Micron Thick Fine-Grained Ni-58Fe Alloy Coating A 10×15 cm sample was cut from a "defective" 10 mm thick fully cured conductive carbon-fiber reinforced plastic (CFRP) sheet of LTM16, an epoxy pre-impregnated carbon fiber cloth composite frequently used in composite tooling. The panel was deemed defective due to large cracks present in the epoxy as a result of improper curing during manufacture. The sample was ground with 80 grit SiC paper, cleaned, rinsed and degreased as described in Example I.

Figure 2:
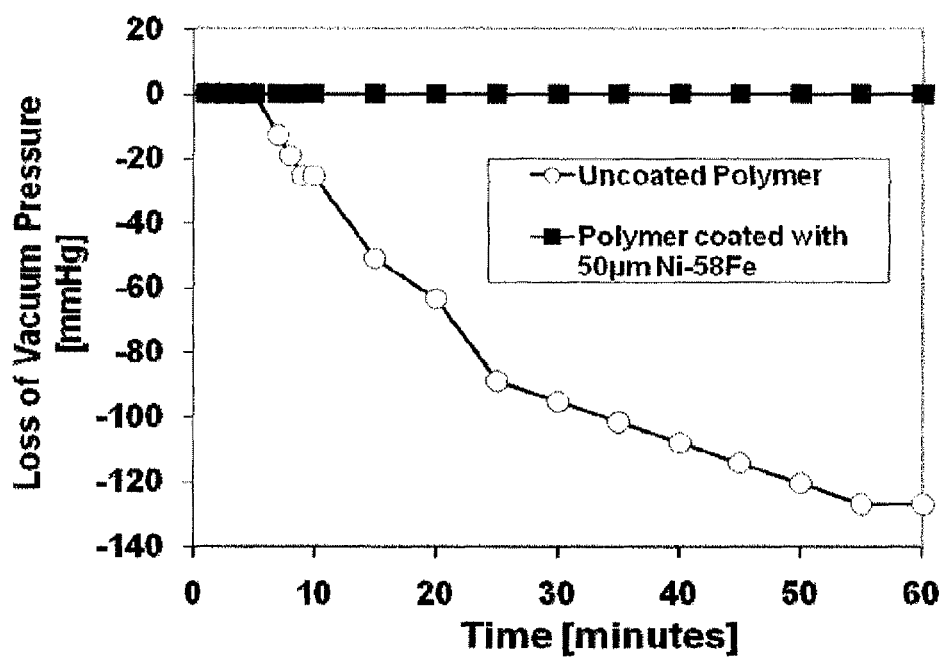
FIG. 2 displays the vacuum level as a function of time for a CFRP tool illustrated in FIG. 1 in which the resin is microcracked, before and after coating with 50 μm of a fine-grained Ni-58Fe alloy.

The "vacuum leak rate" or "vacuum integrity" of the CFRP sample was measured using the vacuum test fixture described applying a vacuum pressure of 29 in Hg and recording the vacuum as a function of time. Thereafter the CFRP sample was cleaned again following the procedure outlined above, was chemically etched in chromic-sulfuric acid and metal-ized using a commercial silvering solution (available from Peacock Laboratories Inc., of Philadelphia, Pa., USA; average grain size 28 nm) and coated with a 50 µm thick layer of fine-grained Ni-58Fe (average grain size: ~20 nm, porosity: 0.1%) according to the process of U.S. Ser. No. 10/516,300 (2002). FIG. 1 shows a cross-section of the metal-plated carbon-fiber reinforced polymer sheet. To better illustrate the features, the top right insert shows a higher magnification of the surface layer, highlighting the metallic layer deposited on the outmost carbon-fiber polymer layer. The insert below depicts a higher magnification of several "interior" carbon-fiber polymer layers highlighting the massive cracking. The vacuum integrity of the Ni-58Fe coated CFRP sample was then measured following the procedure outlined above and FIG. 2 illustrates the differences in permeability between the uncoated and the coated carbon-fiber polymer part. The vacuum integrity measurements performed before coating revealed that the tool had a leak rate of approximately 130 mm Hg/hr over the 3" diameter surface (45.6 cm$^2$ measuring area), or 2.85 mm Hg per hour and cm$^2$ measurement area, whereas after coating, the tool was found to be vacuum tight over the test duration of 1 hour without sustaining any vacuum loss (0 mm Hg per hour and cm$^2$ measurement area).

WORKING EXAMPLE III

Vacuum Integrity of Reinforced Polymers Coated with 0, 50, 150, 200 Micron Fine-Grained Metal-Coated After a Drop Test Four 10×15 cm coupons were cut from a 6 mm thick fully cured conductive carbon-fiber reinforced plastic (CFRP) sheet of Duratool-450™, a bismaleimide pre-impregnated carbon fiber cloth composite used in high temperature resistant composite tooling available from Cytec Engineered Materials of Anaheim, Calif. The samples were mechanically abraded and cleaned as described in Example I.

Three of the CFRP panels were then chemically etched and Ag metalized as described in Example II. Thereafter the samples were and coated with 50, 150 and 200 µm thick layers of fine-grained Ni-58Fe (average grain size: ~20 nm, porosity: 0.1%) according to the electroplating process of U.S. Ser. No. 10/516,300 (2002).

All four CFRP panels were then subjected to impact damage (following ASTM D7136 "*Standard Test Method for Measuring the Damage Resistance of a Fiber-Reinforced Polymer Matrix Composite to a Drop-Weight Impact Event*"), dropping a 4-pound weight from a height of 48" onto the test samples. After impact testing the test samples were visually examined and tested for vacuum integrity as described in Example II.

Visual examination of the samples revealed that severe cracking occurred in the uncoated CFRP panel and a small amount of tearing and blistering in the coating of the 50 µm thick coated sample. In both 150 µm and 200 µm thick coated samples only slight dents were visible on the surface.

Figure 3:
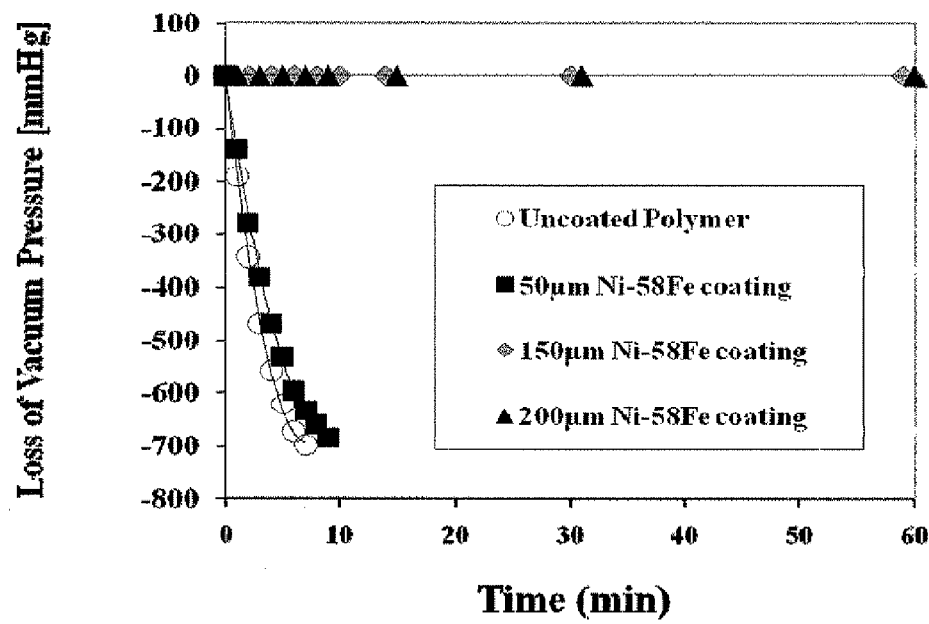
FIG. 3 shows the vacuum leak rate of CFRP test panels with various thicknesses of fine-grained Ni-58Fe alloy coatings after being subjected to impact testing.

The "vacuum leak rate" or "vacuum integrity" of the uncoated and coated CFRP samples was measured as described in Example II and the change in vacuum pressure as a function of time is shown in FIG. 3. After impact testing, the high vacuum leak-rate observed for the uncoated and 50 µm thick samples is indicative of significant damage to the structure resulting in a loss in vacuum integrity. The test results also indicate that a fine-grained metallic coating thickness of at least 150 µm is required to prevent impact damage induced loss of vacuum integrity and to retain a vacuum tight surface, even if the underlying substrate is cracked.

WORKING EXAMPLE IV

Vacuum Integrity of Various Metal-Coated Reinforced Polymers After a Drop Test A number of 10×15 cm coupons were cut from a 6 mm thick fully cured conductive carbon-fiber reinforced plastic (CFRP) sheet of LTM16, an epoxy pre-impregnated carbon fiber cloth composite used in composite tooling available from the Advanced Composites Group Ltd. of Heanor, Derbyshire, United Kingdom. The samples were mechanically abraded, cleaned and degreased as described in Example I.

The CFRP panels were then subjected to impact damage (following ASTM D7136 "*Standard Test Method for Measuring the Damage Resistance of a Fiber-Reinforced Polymer Matrix Composite to a Drop-Weight Impact Event*"). After impact testing the test samples were visually examined and tested for vacuum integrity following the same procedure described in the Example II. As a consequence of the damage caused by the impact test all samples experienced a significant leak rate which was similar in all coupons.

The CFRP panels were then chemically etched and Ag-metalized as described in Example II. Thereafter samples were coated with 200 µm thick metallic coatings of (a) fine-grained Ni, (b) fine-grained Co—P, (c) fine-grained Cu, (d) fine-grained Ni-20Fe, (e) fine-grained Ni-80Fe [all according to U.S. Ser. No. 10/516,300 (2002)], and (f) chromium from a solution containing 400 g/l $Cr_2O_3$ and 5 g/l $H_2SO_4$.

Figure 4:
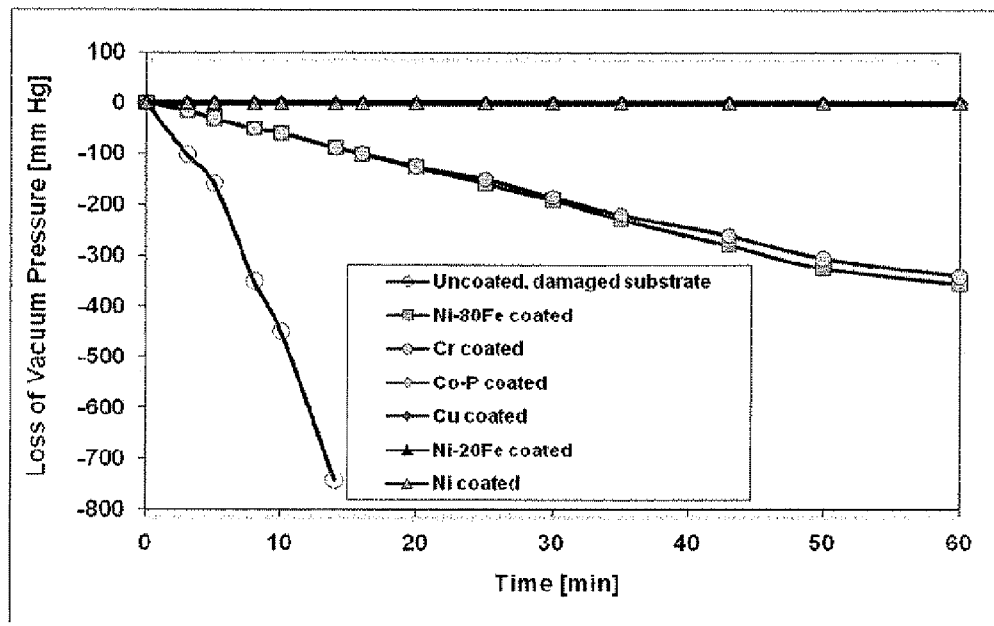
FIG. 4 shows a comparison between the vacuum leak rate of a) damaged CFRP sample and damaged CFRP samples coated with 200 micron of: (b) fine-grained Ni-80Fe, c) Cr, (d) fine-grained Co-2P, (e) fine-grained Cu, (f) fine-grained Ni-20Fe, and (g) fine-grained Ni.

The vacuum integrity of the coated samples was then tested again. The vacuum leak rate in the damaged CFRP samples and subsequently coated samples was then measured as a function of time over one hour, and is displayed in FIG. 4 and Table 3.

To determine the porosity the "as plated" samples were polished to a 1 µm diamond polish and imaged in a light microscope to 400× magnification. The % porosity was determined for a number of samples using image analysis relating the area fraction of pores, cracks, pits etc. to the total surface of the samples. It is notable that only the substantially porosity-free (porosity less than 1.5%) and crack free coatings fully restored the vacuum integrity. For both the chromium and the fine-grained Ni-80Fe coated samples, the application of the coating to the damaged CFRP sample did not sufficiently restore the vacuum integrity and the metallographic examination revealed that both coatings "as plated" are severely "micro-cracked" throughout the coating as illustrated by the high porosity values and therefore fail to provide a gas-tight surface. FIG. 5 shows microscope pictures for various coatings comprising Ni, namely (a) nanocrystalline Ni (grain size: ~20 nm, porosity: 0.3%), (b) fine-grained Ni (grain size: ~125 nm, porosity: 0.3%), (c) n-Ni-20Fe (grain size: ~20 nm, porosity: 0.1%), (d) n-Ni-50Fe (grain size: ~20 nm, porosity: 0.2%), (e) n-Ni-80Fe (grain size: ~20 nm, porosity: 1.7%), (f) a-Ni-7P (amorphous, porosity: 0.2%).

TABLE 3

Vacuum Integrity Comparison of Uncoated Polymer Samples Exposed to an Impact Test According to ASTM D7136 and Polymer Samples Coated after the Impact Test with 200 µm Thick Metallic Layers.

| Sample ID | Average grain size [nm] | Coating Porosity [%] | Vacuum Loss Rate After Applying a Vacuum of 29" Hg [mm Hg/(hr × cm² area)] |
|---|---|---|---|
| Uncoated CFRP Sample | N/A | N/A | 70 |
| 200 Micron Thick Fine-Grained Ni | ~20 | 0.3 | 0 |
| 200 Micron Thick Fine-Grained Co-P | ~15 | 0.1 | 0 |
| 200 Micron Thick Fine-Grained Cu | ~500 | 0.2 | 0 |
| 200 Micron Thick Fine-Grained Ni-20Fe | ~15 | 0.1 | 0 |
| 200 Micron Thick Fine-Grained Ni-80Fe | ~20 | 1.7 | 7.8 |
| 200 Micron Thick Hard Chromium | — | 1.6 | 7.8 |

WORKING EXAMPLE V

Vacuum Integrity of Uncoated and Metal-Coated Carbon Fiber Reinforced Polymer Tubes After Gravelometer Testing Two 15 cm long thin walled tubular carbon fiber reinforced plastic (CFRP) test tubes (~1.5 cm OD, 0.6 mm wall thickness) made from prepregs (Newport Adhesives and Composites, Irvine, Calif., USA) were cut from a CFRP tube for impact testing. One of the test CFRP tubes was used as received the other one was abraded and cleaned as described in Example II. The sample tube was chemically etched in alkaline permanganate solution (M-Permanganate P, Product Code No. 79223) available from MacDermid Inc. of Waterbury, Conn., USA at 65° C. Following etching, the samples were rinsed in deionized water and submerged in neutralizer solution (M-Neutralize, Product Code No. 79225 also available from MacDermid Inc.) for 5 minutes at room temperature. After neutralizing, the samples were rinsed with deionized water and metalized using a commercial amorphous electroless Ni-7P coating available from MacDermid Inc. of Waterbury, Conn., USA and thereafter coated with a thin layer of electroless Ni, followed by a 100 µm thick fine-grained nickel coating (average grain size ~20 nm, porosity: 0.2%) according to the process of U.S. Ser. No. 10/516,300 (2002). Uncoated and coated CFRP specimens were then subjected to an impact test according to SAF J400 "*Test for Chip Resistance of Surface Coatings*". The test samples were secured in a Q-Panel Gravelometer tester and 473 ml (1 Pint) of Q-Panel water-worn road gravel, not passing through a 9.5 mm space screen was placed in the gravelometer hopper. The gravel was emptied from the hopper within 10 seconds at an air pressure of 70 psi and directed at the samples. The hopper was reloaded and the procedure repeated until the total gravel exposure amounted to 13 pints. Thereafter, samples were tested for vacuum integrity by plugging one end of the test tube and connecting the open end to a vacuum pump. After 29" Hg vacuum was reached the valve connecting the test fixture to the vacuum pump was closed and the pressure change monitored with time. The uncoated tube, due to the significant structural damage, did not even reach the desired vacuum and are therefore termed as "failed". The coated sample reached the 29" Hg vacuum and the vacuum pressure decay over 60 minutes was recorded. The results of the test are summarized in Table 4 and indicate that the sample coated with 100 micron fine-grained Ni maintained the pressure for the duration of the test. FIG. 6 shows a photograph of a coated and uncoated sample after gravelometer testing revealing the severe cracking which occurred in the uncoated CFRP sample while the sample coated with a fine-grained nickel coating maintained its structural integrity.

TABLE 4

Chip Resistance Comparison Between a Coated and an Uncoated CFRP Tube after Bombardment with 13 Pints of Gravel According to SAE J400.

| Sample ID | Observations | Vacuum Value One Hour After Applying a Vacuum of 29" Hg [" Hg] |
|---|---|---|
| Uncoated CFRP Sample | Severe cracking and flaking of the CFRP tube with a section separated from tube; cracking began after about 4 pints | N/A-Fail |
| 100 Micron Thick Fine-Grained Ni Coated CFRP Sample According to the Invention | visible dents in sample were noted, neither coating delamination nor visible damage to the carbon tube occurred | 29" |

WORKING EXAMPLE VI

Vacuum Integrity Test of Various Coated and Uncoated CFRP Substrates

Cured graphite fiber/epoxy prepreg sheets (Newport Adhesives and Composites, Irvine, Calif., USA) were cut into 10 cm by 15 cm (4" by 6") coupons (1 mm thick). Coupons to be coated were chemical etched using a chromic/sulfuric acid etch and subsequently an Ag intermediate layer was applied as outlined in Example II. Thereafter the samples were plated with fine-grained metals (n-Ni, n-Ni-20Fe and n-Co-2P) to form 100 micron thick coatings as is described in U.S. Ser. No. 10/516,300 (2002). The vacuum integrity of three sets each of the coated and uncoated samples was measured after the samples were exposed to a "gravelometer test" according to ASTM D3170/SAE J400: "*Standard Test Method for Chipping Resistance of Coatings*" as described in Example V using 1 pint (approximately 300 pieces) of gravel projected at the sample using 70 psi air pressure for 10 seconds. After removal, the test samples were cleaned and subjected to the Vacuum Integrity Test. The uncoated substrate was visibly cracked while the coated samples all showed some surface damage without visible cracks. Thereafter the samples were submitted to a Vacuum Integrity Test. Table 5 displays the test results indicating that all fine-grained metallic coatings protected the polymer substrate from cracking, while the uncoated, unprotected polymer substrate had totally lost its structural properties and vacuum integrity.

TABLE 5

Adhesion and Vacuum Integrity Test Results

| Substrate Chemistry | Metallic Coating Chemistry [Average Grain Size in nm] | Pull-Off Strength ASTM D4541-02 Method E [psi] | Vacuum Loss Rate After Applying a Vacuum of 29" Hg [mm Hg/(hr × cm² area)] | Metal Coating Porosity [%] |
|---|---|---|---|---|
| Graphite Fiber/Epoxy Composite | N/A | N/A | N/A - Failed | N/A |
| Graphite Fiber/Epoxy Composite | 80Ni—20Fe (15 nm) | 350 | 0 | 0.10 |
| Graphite Fiber/Epoxy Composite | Ni (20 nm) | 350 | 0 | 0.20 |
| Graphite Fiber/Epoxy Composite | Co—2P (15 nm) | 350 | 0 | 0.10 |

WORKING EXAMPLE VII

Thermal Cycling and Vacuum Integrity Performance of Fine-Grained Ni—Fe Coated Graphite Composite Graphite fiber/epoxy sheets were sourced from Newport Adhesives and Composites, Irvine, Calif., USA, and were cut into 10 cm by 10 cm coupons. The surface of the coupons was mechanically ground using P1000 sandpaper exposing carbon fibers, then cleaned, rinsed and degreased as described in Example I.

The CLTE of the coupon in the plane was $5 \times 10^{-6}$ $K^{-1}$ and normal to the plane $60 \times 10^{-6}$ $K^{-1}$. After surface preparation the surface roughness of the coupons was determined to be Ra ~2.0 micron and $Ry_{max}$ ~10.0 micron. Microscope analysis revealed that the anchoring structures predominately included cross-hetched grooves and their population amounted to 1,000 per cm. The coupons were encapsulated to a coating thickness of ~50 micron by depositing fine-grained Ni-20Fe alloys (average grain size ~15 nm, porosity: 0.1%) from a modified Watts nickel bath and using a Dynatronix (Dynanet PDPR 20-30-100) pulse power supply as described in U.S. Ser. No. 10/516,300 (2002). Coated samples were exposed to a thermal cycling test which involves vertical submersion into liquid nitrogen (T=−196° C.) for one minute, immediately followed by submersion in hot water (T=90° C.) for one minute. After ten cycles the sample is inspected for delamination, blistering, cracks and the like and the relative displacement of the coating determined. Thirty such thermal cycles were performed. All samples passed the liquid nitrogen/hot water cycling test without delamination. In addition, another set of samples was exposed to 10 thermal cycles according to the ANSI/ASTM specification B604-75 section 5.4 "*Thermal Cycling Test for Service Condition 4*" (85° C. to −40° C.) without failure. The adhesion between the metallic layer and the polymer substrate was determined using ASTM D4541-02 Method E using the self alignment adhesion tester type V described in Annex A5, specifically the "PosiTest AT Adhesion Tester" available from the DeFelsko Corporation of Ogdensburg, N.Y., USA. The vacuum integrity was determined as in Example II. The data are displayed in Table 6.

TABLE 6

Thermal Cycling, Adhesion and Vacuum Integrity Test Results

| Substrate Chemistry: | Graphite Fiber/Epoxy Composite |
|---|---|
| Min/Max Substrate CLTE: [$10^{-6}$ K$^{-1}$] | 5/60 |
| Metallic Coating Chemistry (Average Grain Size in nm) | 80Ni-20Fe (15 nm) |
| Metallic Coating CLTE: [$10^{-6}$ K$^{-1}$] | 11 |
| Thermal Cycling Test (−196 to 90° C.) Performance after 10 cycles/ Displacement ΔL/L [%] | Pass/~0 |
| ANSI/ASTM Specification B604-75 section 5.4 Thermal Cycling Test/SC4; 10 cycles/Displacement ΔL/L [%] | Pass/~0 |
| Pull-Off Strength: ASTM D4541-02 Method E [psi] | 350 |
| Vacuum Loss Rate After Applying a Vacuum of 29" Hg [mm Hg/(hr × cm² area)] | ~0 |

WORKING EXAMPLE VIII

Vacuum Integrity of Fine-Grained Ni-58Fe Coated Carbon Fiber Cloth Reinforced Bismaleimide Polymer Composite Activated by Various Chemical and Anodically Assisted Chemical Etching Processes 3.75×8.75 cm coupons were cut from a 6 mm thick fully cured conductive carbon-fiber reinforced plastic (CFRP) sheet of HTM 512, a bismaleimide pre-impregnated carbon fiber cloth composite used in high temperature resistant composite tooling available from the Advanced Composites Group Ltd. of Heanor, Derbyshire, United Kingdom. The CLTE of the substrate material is 3×10$^{-6}$ K$^{-1}$ in the plane and 70×10$^{-6}$ K$^{-1}$ in the direction normal to the plane. The initial substrate preparation procedure was as follows: (i) mechanically abrading all exposed surfaces using 320 grit to a uniform finish, (ii) scrubbing with steel wool and Alconox cleaner, followed by a rinse in deionized water and (iii) rinsing with isopropanol, followed by drying. Thereafter the composite coupons were processed in various etching solutions, namely an alkaline permanganate etch, a chromic acid etch, a sulfuric acid etch and a sodium hydroxide etch with and without anodic assist. Microscope analysis revealed anchoring structures included cross-hetched grooves, cavities, pitted anchoring structures and protruding anchoring fibers and, depending on the sample, their population amounted to between about 3,000 and about 25,000 per cm. Subsequently, the samples were metalized using a commercial silvering solution (available from Peacock Laboratories Inc., of Philadelphia, Pa., USA; average grain size 28 nm) and coated with a 50 µm thick layer of fine-grained Ni-58Fe (CLTE; ~2×10$^{-6}$ K$^{-1}$, average grain size _18 20 nm, porosity: 0.1%) according to U.S. Ser. No. 10/516,300 (2002). Following plating, the adhesion strength was measured using ASTM D4541-02 Method E "Standard Test Method for Pull-Off Strength of Coatings Using Portable Adhesion Testers" using the "PosiTest AT Adhesion Tester" made by DeFelsko Corporation of Ogdensburg, N.Y., USA. In all cases debonding occurred between the polymer material surface and the adjacent metal layer. Samples were also exposed to 10 thermal cycles according to ANSI/ASTM specification B604-75 section 5.4, service condition 4. The vacuum integrity was determined as in Example II but using a 1" diameter measurement area.

For each different etch solution chemistry, CFRP samples were tested under 3 different conditions: 1) passive dip in solution for 5 min, 2) anodically polarized at 50 mA/cm² for 5 min, and 3) anodically polarized at 100 mA/cm² for 5 min. Following etching the samples were neutralized, as appropriate and then rinsed in deionized water and the resulting mass loss from etching was documented.

The etch compositions, etching conditions, thermal cycling performance and adhesion strength after etching are shown in Tables 7-10 below. In all etch solutions investigated a significant increase in adhesion strength is obtained (>30%) by applying an anodic current assist during etching without any increase in etching time. The adhesion strength was found to increase with increased anodic assisted etch current density (100 mA/cm² compared to 50 mA/cm²). The oxidizing etch solutions (permanganate and chromic) were found to provide the highest adhesion values.

Apart from two all samples passed 10 thermal cycles according to ANSI/ASTM specification B604-75 section 5.4, service condition 4 without failure as well as the Vacuum Integrity Test.

TABLE 7

Permanganate Etch

| Solution Type | Chemical Composition |
|---|---|
| MacDermid Permanganate Etch 5 min @ 45° C. | M-Permanganate: 60 g/L M-79224: 60 g/L D.I. Water: 940 g/L |

| Etching Type | Adhesion (ASTM D4541-02 Method E) [psi] | Thermal Cycling Test (ANSI/ASTM B604-75 section 5.4); Service Condition 4, 10 Cycles/Displacement ΔL/L [%] | Vacuum Loss Rate After Applying a Vacuum of 29" Hg [mm Hg/(hr × cm² area)] |
|---|---|---|---|
| Dip only | 433 | Pass/~0 | ~0 |
| Dip & Anodic Etch @ 50 mA/cm2 | 668 | Pass/~0 | ~0 |
| Dip & Anodic Etch @ 100 mA/cm2 | 1069 | Pass/~0 | ~0 |

TABLE 8

Sulfuric Acid Etch

| Solution Type | Chemical Composition |
|---|---|
| Sulfuric Acid Etch 5 min @ 25° C. | H$_2$SO$_4$: 5% (in D.I. water) |

| Etching Type | Adhesion (ASTM D4541-02 Method E) [psi] | Thermal Cycling Test (ANSI/ASTM B604-75 section 5.4); Service Condition 4, 10 Cycles/Displacement ΔL/L [%] | Vacuum Loss Rate After Applying a Vacuum of 29" Hg [mm Hg/(hr × cm² area)] |
|---|---|---|---|
| Dip only | 169 | Fail/delamination | N/A |
| Dip & Anodic Etch @ 50 mA/cm2 | 227 | Pass/~0 | ~0 |
| Dip & Anodic Etch @ 100 mA/cm2 | 328 | Pass/~0 | ~0 |

TABLE 9

Sodium Hydroxide Etch

| Solution Type | Chemical Composition |
|---|---|
| Sodium Hydroxide Etch 5 min @ 25° C. | NaOH: 25% (in D.I. water) |

| Etching Type | Adhesion (ASTM D4541-02 Method E) [psi] | Thermal Cycling Test (ANSI/ASTM B604-75 section 5.4); Service Condition 4, 10 Cycles/Displacement ⌀L/L [%] | Vacuum Loss Rate After Applying a Vacuum of 29" Hg [mm Hg/(hr × cm² area)] |
|---|---|---|---|
| Dip only | 185 | Fail/delamination | N/A |
| Dip & Anodic Etch @ 50 mA/cm2 | 409 | Pass/~0 | ~0 |
| Dip & Anodic Etch @ 100 mA/cm2 | 643 | Pass/~0 | ~0 |

TABLE 10

Chromic Acid Etch

| Solution Type | Chemical Composition |
|---|---|
| Chromic Acid Etch 5 min @ 50° C. | Chromic acid: 5% Phosphoric acid: 15% Sulfuric acid: 55% (in D.I. water) |

| Etching Type | Adhesion (ASTM D4541-02 Method E) [psi] | Thermal Cycling Test (ANSI/ASTM B604-75 section 5.4); Service Condition 4, 10 Cycles/Displacement ⌀L/L [%] | Vacuum Loss Rate After Applying a Vacuum of 29" Hg [mm Hg/(hr × cm² area)] |
|---|---|---|---|
| Dip only | 408 | Pass/~0 | ~0 |
| Dip & Anodic Etch @ 50 mA/cm2 | 772 | Pass/~0 | ~0 |
| Dip & Anodic Etch @ 100 mA/cm2 | 893 | Pass/~0 | ~0 |

WORKING EXAMPLE IX

Vacuum Integrity of Graphite and Glass Filled Polymer Composites Activated by Acid Etching and Coated with an Amorphous Ni-Based Layer or Coated with an Intermediate Conductive Layer and a Fine-Grained Ni Layer 10 cm by 10 cm coupons (thickness 2 mm) of various substrates were suitable pretreated using a chromic acid etch solution, dip only, as per Working Example VIII, Table 10 and coated with various fine-grained materials available from Integran Technologies Inc. (www.integran.com; Toronto, Canada) to a metallic layer thickness of ~100 micron. Substrate materials included graphite/epoxy sourced from Newport Adhesives and Composites, Irvine, Calif., USA and glass fiber/polyamide composite coupons supplied by the Goodfellow Corporation, Oakville, Pa., USA. After appropriate chemical activation (chromic acid etch according to Table 10, dip only) all samples subjected to electroplating were metalized using a commercial silvering solution (available from Peacock Laboratories Inc., of Philadelphia, Pa., USA; average grain size 28 nm). Microscope analysis revealed anchoring structures included cross-hatched grooves, cavities, pitted anchoring structures and protruding anchoring fibers and, depending on the sample, their population amounted to between about 3,000 and about 10,000 per cm. Subsequently, fine-grained Ni-based metallic layers were deposited from a modified Watts bath as described in U.S. Ser. No. 10/516,300 (2002). Amorphous Ni-based layers (~20 micron thick Ni-7P) were deposited directly onto the etched polymer substrates using an electroless nickel bath available from MacDermid Inc., Waterbury, Conn., USA. The coated samples were exposed to the thermal cycling test described above. The adhesion strength was measured using ASTM D4541-02 Method E using the "PosiTest AT Adhesion Tester" available from the DeFelsko Corporation of Ogdensburg, N.Y., USA. In all cases debonding occurred between the polymer material surface and the immediately adjacent metal layer. Vacuum integrity was measured using the test fixture described above measuring the vacuum loss at an applied vacuum of 29" of Hg on an area of 3" diameter (45.6 cm²) after one hour. The data displayed in Table 11 indicate that acceptable thermal cycling, pull-off strength and vacuum integrity performance is achieved.

TABLE 11

Thermal Cycling, Adhesion and Vacuum Intergity Test Results

| Polymer Substrate Chemistry | Glass Fiber/ Polyamide Composite | | | Graphite Fiber/Epoxy Composite | | |
|---|---|---|---|---|---|---|
| Min/Max Substrate CLTE [$10^{-6}$ K$^{-1}$] | 20/110 | | | 5/55 | | |
| Metallic Coating Chemistry (Average grain size in nm) | Ni—7P (amorphous) | Ni (15 nm) | Ni—50Fe (20 nm) | Ni—7P (amorphous) | Ni (15 nm) | Ni—50Fe (20 nm) |
| Metallic Coating CLTE [$10^{-6}$ K$^{-1}$] | 20 | 13 | 10 | 20 | 13 | 10 |
| Porosity [%] | 0.2 | 0.3 | 0.2 | 0.2 | 0.3 | 0.2 |
| Thermal Cycling Test (−196 to 90° C.) Performance after 10 cycles/Displacement ⌀L/L [%] | Pass/~0 | Pass/~0 | Pass/~0 | Pass/~0 | Pass/~0 | Pass/~0 |

TABLE 11-continued

Thermal Cycling, Adhesion and Vacuum Intergity Test Results

| Polymer Substrate Chemistry | Glass Fiber/ Polyamide Composite | | | Graphite Fiber/Epoxy Composite | | |
|---|---|---|---|---|---|---|
| Pull-Off Strength ASTM D4541-02 Method E [psi] | 300 | 300 | 300 | 620 | 620 | 620 |
| Vacuum Loss Rate After Applying a Vacuum of 29" Hg [mm Hg/(hr × cm² area)] | 0 | 0 | 0 | 0 | 0 | 0 |

WORKING EXAMPLE X

Vacuum Integrity of Fine-Grained N—Fe Alloy-Coated Carbon Fiber Reinforced Polymer Panels After Thermal Cycling Testing Four 20×20 cm panels were cut from a 6 mm thick fully cured conductive carbon-fiber reinforced plastic (CFRP) sheet obtained from Janicki Industries of Sedro-Woolley, Wash. The panels were ground with 80 grit SiC paper, cleaned, rinsed and degreased as described in Example 1.

The CFRP panels were anodically etched at 100 mA/cm² as per Example VIII, Table 7, metalized using a commercial silvering solution (available from Peacock Laboratories Inc., of Philadelphia, Pa., USA) and coated with a 250 µm thick layer of fine-grained Ni-58Fe (average grain size ~20 nm, CLTE: ~2×10⁻⁶ K⁻¹, porosity: 0.1%) according to the process of U.S. Ser. No. 10/516,300 (2002).

All four CFRP panels were then subjected to an accelerated thermal cycling test consisting of immersing the test samples in boiling water for a period of 24 hrs followed by drying in an oven at 200° C. for a period of 2 hours. Following each thermal cycle the test samples were visually observed for any signs of coating delamination or degradation. The adhesion strength and vacuum integrity of the coated samples was tested after 0, 1, 5 and 10 thermal cycles.

Visual examination of the samples revealed severe cracking of the resin of the CFRP panels after 10 thermal cycles, however, no cracking in the coating was observed. Vacuum integrity measurements showed no loss of vacuum integrity, thus confirming the coating was indeed intact and structurally sound. Adhesion measurements performed after each thermal cycling interval showed that there was no significant loss of pull-off strength even though the resin in the CFRP was found to significantly degrade as indicated in Table 12. Similar performance was obtained when 10 thermal cycles according to ANSI/ASTM specification B604-75 section 5.4, service condition 4 were used.

TABLE 12

Thermal Cycling/Adhesion Test Results

| Number of Thermal Cycles (100/200° C.) | Thermal Cycling Test (100/200° C.) Displacement ΔL/L [%] | Pull-Off Strength ASTM D4541-02 Method E [psi] | Vacuum Loss Rate After Applying a Vacuum of 29" Hg [mm Hg/(hr × cm² area)] |
|---|---|---|---|
| 0 | Pass/~0 | 1,460 | 0 |
| 1 | Pass/~0 | 1,540 | 0 |
| 5 | Pass/~0 | 1,555 | 0 |
| 10 | Pass/~0 | 1,360 | 0 |

Variations

The foregoing description of the invention has been presented describing certain operable and preferred embodiments. It is not intended that the invention should be so limited since variations and modifications thereof will be obvious to those skilled in the art, all of which are within the spirit and scope of the invention.

The invention claimed is:

1. A metal-coated polymer article comprising:
   (i) a polymeric material;
   (ii) a metallic material having a microstructure which is fine-grained with an average grain size between 2 and 5,000 nm and/or amorphous, the metallic material being in the form of a metallic layer having a thickness between 10 micron and 2.5 cm and a porosity between 0 and 1.5%;
   (iii) with or without at least one intermediate layer between the polymeric material and the metallic material;
   (iv) said metal-coated polymer article exhibiting:
      a) a pull-off strength between the polymeric material and the metallic material and between any intermediate layer(s) and the metallic material and between any intermediate layer(s) and the polymeric material exceeding 200 psi as determined by ASTM D4541-02 Method A-E; and
      b) said metal-coated polymer article having a leak rate in air of between 0 and 6.6 mm Hg pressure per hour and per cm² measuring area after applying a vacuum of 29" of Hg and measuring the loss of vacuum over the duration of 60 minutes; and
      c) said metal-coated polymer article exhibiting no delamination after said article has been exposed to at least one temperature cycle according to ASTM B553-71 service condition 1, 2, 3 or 4.

2. The article of claim 1 which, after exposure to at least one temperature cycle according to ASTM B553-71 service condition 1, 2, 3 or 4, has a leak rate in air of between 0 and 6.6 mm Hg pressure per hour and per cm² measuring area after applying a vacuum of 29" of Hg and measuring the loss of vacuum over the duration of 60 minutes and a pull-off strength of between 200 and 6,000 psi.

3. The article of claim 1 which, after exposure to the drop test as specified in ASTM D7136, has a leak rate in air of between 0 and 6.6 mm Hg pressure per hour and per cm² measuring area after applying a vacuum of 29" of Hg and measuring the loss of vacuum over the duration of 60 minutes and a pull-off strength of between 200 and 6,000 psi.

4. The article of claim 1 which, after exposure to the gravelometer test as specified in ASTM D3170-03 or SAE J4001 projecting one pint of gravel at the sample at 70 psi over 10 seconds, has a leak rate in air of between 0 and 6.6 mm Hg pressure per hour and per cm² measuring area after applying a vacuum of 29" of Hg and measuring the loss of vacuum over the duration of 60 minutes and a pull-off strength of between 200 and 1,500 psi.

5. The article according to claim 1 wherein said metallic material is selected from the group of:
   (i) one or more metals selected from the group consisting of Ag, Al, Au, Co, Cr, Cu, Fe, Ni, Mo, Pd, Pt, Rh, Ru, Sn, Ti W, Zn and Zr,
   (ii) metals or alloys containing at least two of metals of (i), further containing at least one element selected from the group of B, C, H, O, P and S;
   (iii) any of (i), or (ii) where said metallic layer also contains particulate additions in the volume fraction between 0 and 95% by volume.

6. The article according to claim 5, wherein the metallic layer contains at least one particulate addition and said particulate addition is at least one of
   a metal selected from the group consisting of Ag, Al, Cu, In, Mg, Si, Sn, Pt, Ti, V, W, and Zn;
   a metal oxide selected from the group consisting of $Ag_2O$, $Al_2O_3$, $SiO_2$, $SnO_2$, $TiO_2$, and $ZnO$;
   a carbide of B, Cr, Bi, Si, and/or W;
   a carbon material including carbon nanotubes, diamond, graphite, and graphite fibers;
   a material selected from the group consisting of ceramic and glass; and
   a polymer material selected from the group consisting of PTFE, PVC, PE, PP, ABS and epoxy resin.

7. The article according to claim 1 containing a polymeric material selected from the group consisting of epoxy resins, phenolic resins, polyester resins, urea resins, melamine resins, thermoplastic polymers, polyolefins, polyethylenes, polypropylenes, polyamides, poly-ether-ether-ketones, mineral filled polyamide resin composites, polyphthalamide, polyphtalates, polystyrene, polysulfone, polyimides, neoprenes, polyisoprenes, polybutadienes, polyisoprenes, polyurethanes, butadiene-styrene copolymers, chlorinated polymers, polyvinyl chloride, fluorinated polymers, polytetrafluoroethylene, polycarbonates, polyesters, liquid crystal polymers, partially crystalline aromatic polyesters based on p-hydroxybenzoic acid, polycarbonates, acrylonitrile-butadiene-styrene, their copolymers and their blends.

8. The article according to claim 1 wherein the metallic layer metallic material represents between 5 and 95% of the total weight of the article.

9. The article according to claim 1 further comprising an electrically conductive intermediate layer between said metallic material and said polymeric material.

10. The article according to claim 9 where the electrically conductive intermediate layer comprises a metallic layer constituted of Ag, Ni or Cu or a combination of any two or all of these, and where the intermediate conductive layer is deposited by electroless deposition, sputtering, thermal spraying, chemical vapor deposition, physical vapor deposition or by any two or more of these.

11. The article according to claim 9 where the electrically conductive intermediate layer comprises polymeric material with conductive particulates therein.

12. The article according to claim 11 where the electrically conductive intermediate layer is a conductive paint or a conductive epoxy.

13. The article according to claim 12 where the electrically conductive particulates are composed of, or contain, Ag, Ni or Cu or graphite or other conductive carbon or a combination of two or more thereof.

14. The article according to claim 1, wherein said article is an automotive, aerospace, or sporting equipment component or part.

15. The article according to claim 14 selected from the group consisting of golf club heads, hockey sticks, baseball/softball bats, tennis racquets, lacrosse sticks, ski poles, walking sticks, skate blades, snowboards, bicycle frames, molds, plane fuselage, wings, rotors, propellers, medical implants, surgical tools, molds and molding tools, cell phones, personal digital assistants (PDAs) devices, walkmen, discmen, MP3 players, digital cameras, recording devices, liquid conduits, fuel rails, spoilers, grill-guards, running boards, brake, transmission, clutch, steering and suspension parts, brackets and pedals, muffler components, wheels, vehicle frames, fluid pumps, housings and tank components such as oil, transmission or other fluid pans, gas tanks, electrical and engine covers and turbocharger components, actuator cylinders and cryogenic storage tanks.

16. The article according to claim 1, wherein said article has a tubular structure and said metallic material extends over at least part of the inner or outer surface of said tubular structure.

17. The article according to claim 16 selected from the group of gun barrels, drive shafts, arrow shafts, golf shafts, tubes, pipes, rods, fishing rods, cartridge casing, baseball/softball bats, hockey sticks, wires, cables, fishing, skiing and hiking poles.

18. The article according to claim 14 wherein said polymeric material contains at least one material selected from the group consisting of glass fibers, graphite, graphite fibers, carbon, carbon fibers and carbon nanotubes.

19. The article according to claim 1, wherein said polymeric material contains between 2.5% and 75% per weight or volume of one or more fillers selected from the group consisting of carbon, carbon nanotubes, graphite, carbon fibers, graphite fibers, fiberglass, glass fibers, metals, metal alloys, metalized fibers, and metal coated glass fibers.

20. The article according to claim 1, wherein said polymeric material contains between 2.5% and 95% per weight or volume of an electrically conductive filler.

* * * * *

UNITED STATES PATENT AND TRADEMARK OFFICE
CERTIFICATE OF CORRECTION

| | | |
|---|---|---|
| PATENT NO. | : 8,247,050 B2 | Page 1 of 1 |
| APPLICATION NO. | : 12/476485 | |
| DATED | : August 21, 2012 | |
| INVENTOR(S) | : Jonathan McCrea et al. | |

It is certified that error appears in the above-identified patent and that said Letters Patent is hereby corrected as shown below:

On the Title Page of the patent, in the Inventors section (75), delete "Fracisco" and replace with --Francisco--.

Signed and Sealed this

Eighth Day of January, 2013

David J. Kappos
*Director of the United States Patent and Trademark Office*